United States Patent
Tsunooka et al.

(10) Patent No.: US 8,935,079 B2
(45) Date of Patent: Jan. 13, 2015

(54) FUEL SUPPLY SYSTEM FOR INTERNAL COMBUSTION ENGINE

(75) Inventors: Takashi Tsunooka, Gotenba (JP); Yasuyuki Irisawa, Susono (JP); Shinichi Mitani, Susono (JP); Satoshi Yoshizaki, Susono (JP); Akira Satou, Gotenba (JP); Shigeyuki Urano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 344 days.

(21) Appl. No.: 13/636,045

(22) PCT Filed: Mar. 19, 2010

(86) PCT No.: PCT/JP2010/054871
§ 371 (c)(1),
(2), (4) Date: Sep. 19, 2012

(87) PCT Pub. No.: WO2011/114525
PCT Pub. Date: Sep. 22, 2011

(65) Prior Publication Data
US 2013/0013173 A1    Jan. 10, 2013

(51) Int. Cl.
*F02D 41/30* (2006.01)
*F02M 31/18* (2006.01)
*F02D 33/00* (2006.01)
(Continued)

(52) U.S. Cl.
CPC ............ *F02M 31/18* (2013.01); *F02D 33/006* (2013.01); *F02D 19/0605* (2013.01); *F02D 19/0628* (2013.01); *F02D 19/0655* (2013.01); *F02D 19/0665* (2013.01); *F02D 19/0678* (2013.01); *F02D 19/081* (2013.01); *F02D 19/0668* (2013.01); *F02D 41/0025* (2013.01);
(Continued)

(58) Field of Classification Search
USPC .......... 701/104, 113; 123/575, 576, 578, 527, 123/304, 179.15
See application file for complete search history.

(56) References Cited

U.S. PATENT DOCUMENTS 3,699,770 A * 10/1972 Bennethum ............... 60/521
8,393,313 B2 * 3/2013 Sato et al. ............... 123/557
8,453,623 B2 * 6/2013 Kuroki et al. ............... 123/527

FOREIGN PATENT DOCUMENTS

JP     U-58-92454    6/1983
JP     A-5-178102    7/1993
(Continued)

OTHER PUBLICATIONS

International Search Report issued in International Patent Application No. PCT/JP2010/054871 mailed Jun. 29, 2010.

*Primary Examiner* — Hieu T Vo
(74) *Attorney, Agent, or Firm* — Oliff PLC

(57) ABSTRACT

An engine includes a normal fuel tank, fuel gas tank, an in-tank injection valve and a fuel gas supply valve. During operation of the engine, in a state where the fuel gas supply valve is closed, a fuel is injected into the fuel gas tank through the in-tank injection valve to generate a fuel gas by vaporizing the fuel. The fuel gas is stored in the fuel gas tank and is maintained in the gas phase due to the natural decompression even after the engine is stopped. To start the engine, the fuel gas supply valve is opened to supply the fuel gas in the fuel gas tank to a surge tank. Thus, compared with the case where the fuel gas is generated at the start of the engine, the fuel gas can be quickly supplied into the cylinder, so that the ability to start the engine is improved.

13 Claims, 14 Drawing Sheets

(51) Int. Cl.
*F02D 19/06* (2006.01)
*F02D 19/08* (2006.01)
*F02D 41/06* (2006.01)
*F02G 5/00* (2006.01)
*F02D 41/00* (2006.01)

(52) U.S. Cl.
CPC ............... *F02D41/064* (2013.01); *Y02T 10/36* (2013.01); *Y02T 10/126* (2013.01); *F02D 19/0692* (2013.01)
USPC .......................................... 701/104; 123/576

(56) References Cited

FOREIGN PATENT DOCUMENTS

| | | |
|---|---|---|
| JP | A-7-19124 | 1/1995 |
| JP | A-7-151023 | 6/1995 |
| JP | A-9-88740 | 3/1997 |
| JP | A-2003-239788 | 8/2003 |
| JP | A-2006-214415 | 8/2006 |
| JP | A-2007-224878 | 9/2007 |
| JP | A-2009-2314 | 1/2009 |

\* cited by examiner

FUEL SUPPLY SYSTEM FOR INTERNAL COMBUSTION ENGINE

TECHNICAL FIELD

The present invention relates to a fuel supply system for an internal combustion engine that uses a less volatile fuel, such as an alcohol fuel.

BACKGROUND ART

As disclosed in Patent Literature 1 (Japanese Patent Laid-Open No. 2007-224878), for example, a fuel supply system for an internal combustion engine using an alcohol fuel according to a prior art has been known. The alcohol fuel is hard to vaporize particularly at low temperature, so that the conventional internal combustion engine has a vaporizing chamber for vaporizing the fuel at the start of the engine. The vaporizing chamber has an enclosed structure sealed from the outside and is connected to an intake air channel via a throttling channel. The vaporizing chamber is provided with a start fuel injection valve for injecting the fuel into the chamber and a heater for heating the injected fuel.

At the start of the internal combustion engine, the heater is first activated when a start signal is provided to the internal combustion engine, and then, the fuel is injected into the vaporizing chamber through the start fuel injection valve after a lapse of a certain time. When the fuel is injected into the chamber, the vaporizing chamber is in a decompressed state because of an intake air negative pressure due to cranking. Thus, the injected fuel is vaporized by the heat from the heater in the vaporizing chamber in the decompressed state, and the vaporized fuel is supplied to each cylinder through the intake air channel. In this way, according to the prior art, at the start of the engine, the fuel is vaporized in the vaporizing chamber to secure the startability in cold start or the like.

As literatures relating to the present invention, the applicant has been aware of the following literatures including the literature described above.

CITATION LIST

Patent Literature

Patent Literature 1: Japanese Patent Laid-Open No. 2007-224878

Patent Literature 2: Japanese Patent Laid-Open No. 2009-2314

Patent Literature 3: Japanese Patent Laid-Open No. 7-151023

Patent Literature 4: Japanese Patent Laid-Open No. 9-88740

Patent Literature 5: Japanese Patent Laid-Open No. 2006-214415

SUMMARY OF INVENTION

Technical Problem

According to the prior art described above, at the start of the engine, the heater is activated before the fuel is injected into the vaporizing chamber after to generate a fuel gas. However, in this case, after the start signal is provided to the internal combustion engine, the heater is activated to heat the injected fuel and the vaporizing chamber is decompressed, thereby generating the fuel gas. Thus, the prior art has a problem that it tales long to generate the fuel gas at the start of the engine, and the fuel gas cannot be quickly supplied into the cylinders.

The present invention has been devised to solve the problem described above, and an object of the present invention is to provide a fuel supply system for an internal combustion engine that is capable of quickly supplying a fuel gas into a cylinder and improving the startability even when an engine is started at a low temperature.

Means for Solving the Problem

A first aspect of the present invention is a fuel supply system for an internal combustion engine, comprising:
a fuel tank that stores a fuel;
a fuel injection valve through which the fuel in said fuel tank is injected into an intake air channel and/or a combustion chamber;
a fuel gas tank that is connected to said intake air channel and stores a fuel gas generated by vaporizing said fuel;
an in-tank fuel supplying means of supplying the fuel in said fuel tank to said fuel gas tank in order to generate the fuel gas in said fuel gas tank; and
a fuel gas supply valve that is a normally closed valve that opens and closes a connection between said fuel gas tank and said intake air channel and is opened at the start of the internal combustion engine.

In a second aspect of the present invention, further comprising:
generation controlling means of driving said in-tank fuel supplying means during operation of the internal combustion engine in a state where said fuel gas supply valve is closed to generate the fuel gas in said fuel gas tank; and
supply controlling means of opening said fuel gas supply valve at the start of the internal combustion engine to supply the fuel gas stored in said fuel gas tank to said intake air channel during operation of the internal combustion engine.

In a third aspect of the present invention, wherein said generation controlling means is configured to drive said in-tank fuel supplying means in a case where the temperature in said fuel gas tank is higher than a predetermined criterion temperature for judging whether generation of the fuel gas is possible.

In a fourth aspect of the present invention, said supply controlling means is configured to open said fuel gas supply valve in a case where the temperature of the internal combustion engine at the start thereof is lower than a predetermined criterion temperature for judging whether the fuel gas is required.

In a fifth aspect of the present invention, further comprising fuel form switching means of making said supply controlling means supply the fuel gas for combustion in the first cycle at the start of the internal combustion engine and making said fuel injection valve inject the fuel for combustion in the second and subsequent cycles.

In a sixth aspect of the present invention, further comprising an atmosphere introducing valve that is a normally closed valve provided at a position where the atmosphere introducing valve is capable of connecting the interior of said fuel gas tank and the outside space to each other and is opened and closed together with said fuel gas supply valve.

In a seventh aspect of the present invention, further comprising valve opening order changing means of successively opening said fuel gas supply valve and said atmosphere introducing valve when supplying the fuel gas and changing the order of opening of said valves based on the magnitude relationship between the pressure in said fuel gas tank and the atmospheric pressure.

In a eighth aspect of the present invention, further comprising a pressure relief mechanism that relieves the pressure in said fuel gas tank to the outside when the pressure in said fuel gas tank is higher than a predetermined working pressure.

In a ninth aspect of the present invention, further comprising heating means of heating said fuel gas tank.

In a tenth aspect of the present invention, further comprising:

saturation vapor pressure calculating means of calculating the saturation vapor pressure of said fuel; and fuel supply amount calculating means of calculating the amount of fuel to be supplied to said fuel gas tank by said in-tank fuel supplying means based on the saturation vapor pressure of said fuel and the temperature and the volume of said fuel gas tank.

In a eleventh aspect of the present invention, further comprising limiting means of preventing the amount of fuel to be supplied from being calculated based on the saturation vapor pressure when the saturation vapor pressure is higher than the withstanding pressure of said fuel gas tank.

In a twelfth aspect of the present invention, further comprising pressure relief controlling means of opening said fuel gas supply valve in a case where the pressure in said fuel gas tank is equal to or higher than the withstanding pressure of the tank.

In a thirteenth aspect of the present invention, wherein said fuel is an alcohol fuel.

Advantageous Effects of Invention

According to a first aspect of the present invention, the in-tank fuel supplying means can supply the fuel in the fuel tank into the fuel gas tank during operation of the internal combustion engine, and the fuel gas can be generated from the fuel. The fuel gas tank can maintain at least part of the fuel gas in the gas phase even during cold after the engine is stopped by using the natural decompression in the tank. The fuel gas supply valve can be opened at the start of the engine to supply the fuel gas stored in the fuel gas tank to the intake air channel. Therefore, compared with the case where the fuel gas is generated at the start of the engine, the fuel gas can be supplied into the cylinders in a considerably shorter time. As a result, the engine can be quickly started at low temperature at which the fuel gas is hard to generate, and the startability can be improved.

According to a second aspect of the present invention, the generation controlling means drives the in-tank fuel supplying means during operation of the internal combustion engine in a state where the fuel gas supply valve is closed to generate the fuel gas in the fuel gas tank. The supply controlling means can open the fuel gas supply valve at the start of the internal combustion engine to supply the fuel gas stored in the fuel gas tank to the intake air channel.

According to a third aspect of the present invention, the generation controlling means can make the in-tank fuel supplying means supply the fuel into the fuel gas tank in a case where the temperature in the fuel gas tank is higher than the predetermined criterion temperature. As a result, the fuel gas can be efficiently generated at high temperature at which the fuel easily vaporizes, and useless fuel supply at low temperature can be avoided.

According to a fourth aspect of the present invention, the supply controlling means can open the fuel gas supply valve in a case where the temperature of the internal combustion engine at the start thereof is lower than a predetermined criterion temperature. As a result, the fuel gas can be efficiently used only when the engine is started at low temperature when the fuel gas is required. In addition, the fuel gas can be prevented from being wasted when the engine is started at high temperature.

According to a fifth aspect of the present invention, the fuel form switching means can supply the fuel gas for combustion in the first cycle at the start of the internal combustion engine so that combustion of the fuel occurs with reliability at low temperature. For combustion in the second and subsequent cycles, the fuel form switching means can supply fuel injection into the cylinders whose temperature has risen because of the first combustion to smoothly vaporize the injected fuel. In this way, the amount of fuel gas used can be reduced while achieving stable continuous combustion and securing high startability.

According to a sixth aspect of the present invention, the atmosphere introducing valve is opened and closed together with the fuel gas supply valve and can introduce atmosphere into the fuel gas tank when it is open. Thus, when the fuel gas is supplied, air can be introduced into the fuel gas tank through the atmosphere introducing valve in an amount equal to the amount of the fuel gas flowing out of the fuel gas tank. In this way, since the fuel gas supply valve and the atmosphere introducing valve cooperate with each other, the fuel gas can be smoothly supplied.

According to a seventh aspect of the present invention, the valve opening order changing means can change the order of opening of the fuel gas supply valve and the atmosphere introducing valve based on the magnitude relationship between the pressure in the fuel gas tank and the atmospheric pressure. Therefore, when the fuel gas is supplied, the fuel gas in the tank can be prevented from flowing out into the atmosphere through the atmosphere introducing valve, and air can be prevented from flowing from the intake air channel back into the tank through the fuel gas supply valve. Therefore, the flow of the fuel gas can be appropriately controlled.

According to an eighth aspect of the present invention, the pressure relief mechanism can relieve the pressure in the fuel gas tank to the outside when the pressure in the fuel gas tank is higher than the predetermined working pressure. Thus, the fuel supplied into the fuel gas tank can be quickly vaporized while purging the air in the tank to the outside through the pressure relief mechanism. Therefore, the pressure of the air in the fuel gas tank can be prevented from suppressing the vaporization of the fuel, and generation of the fuel gas can be promoted. In addition, the dead volume occupied by air in the tank can be reduced to increase the density of the fuel gas. As a result, a large amount of fuel gas can be efficiently generated and stored in a compact space. In addition, the pressure relief mechanism can serve as a safety valve that prevents the pressure in the tank from being excessive in a state where the fuel gas tank is hermetically sealed.

According to a ninth aspect of the present invention, when the fuel gas is generated, the fuel can be supplied to the fuel gas tank heated by the heating means to promote vaporization of the fuel. In addition, since the saturation vapor pressure of the fuel increases as a result of the heating, the density of the fuel gas in the tank can be increased. As a result, the amount of fuel gas stored in the fuel gas tank can be increased, or the volume of the tank can be reduced.

According to a tenth aspect of the present invention, the fuel supply amount calculating means can calculate the amount of fuel to be supplied to the fuel gas tank based on the saturation vapor pressure of the fuel and the temperature and the volume of the fuel gas tank. Since the saturation vapor pressure is a vapor pressure in a state where as much as possible of the fuel is vaporized, if the amount of fuel calculated in the method described above is supplied, the maximum amount of fuel gas can be generated in the fuel gas tank. Therefore, the volume of the tank can be efficiently used.

According to an eleventh aspect of the present invention, the limiting means can prevent the amount of fuel supply from being calculated based on the saturation vapor pressure when the saturation vapor pressure is higher than the withstanding pressure of the fuel gas tank. As a result, the maximum amount of fuel gas permitted by the withstanding pressure of the fuel gas tank can be generated and stored in the fuel gas tank, so that the volume of the fuel gas tank can be efficiently used while protecting the fuel gas tank.

According to a twelfth aspect of the present invention, the pressure relief controlling means can open the fuel gas supply valve in a case where the pressure in the fuel gas tank is equal to or higher than the withstanding pressure of the tank. Thus, even if the pressure in the fuel gas tank increases to be higher than expected, the pressure can be relieved with reliability to protect the fuel gas tank.

According to a thirteenth aspect of the present invention, even when the alcohol fuel that is hard to vaporize at low temperature is used, the startability can be improved by supplying, at the start of the internal combustion engine, the fuel gas stored during operation of the internal combustion engine.

DESCRIPTION OF EMBODIMENTS

Embodiment 1
[Configuration of Embodiment 1]

Figure 1:
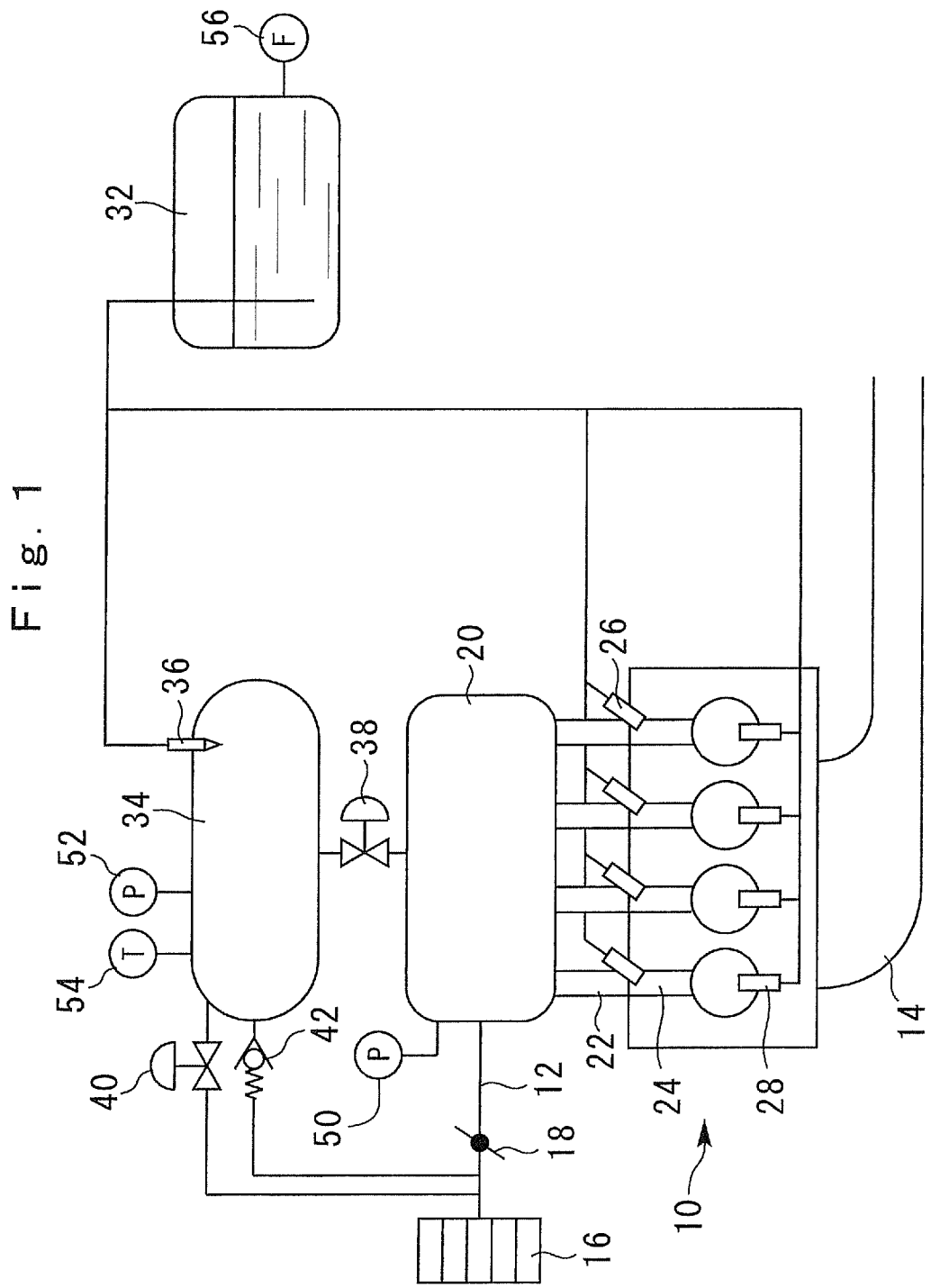
FIG. 1 is a schematic diagram for illustrating a configuration of the whole of a system according to the embodiment 1 of the present invention.

In the following, an embodiment 1 of the present invention will be described with reference to FIGS. 1 to 4. FIG. 1 is a schematic diagram for illustrating a configuration of the whole of a system according to the embodiment 1 of the present invention. The system according to this embodiment includes an engine 10, which is an internal combustion engine, mounted in a flexible fuel vehicle (FFV), for example. Although FIG. 1 shows a multi-cylinder engine having four cylinders as an example, the internal combustion engine according to the present invention is not limited to the four-cylinder engine. The engine 10 has an intake air channel 12 through which air is taken into each cylinder and an exhaust gas channel 14 through which exhaust gas is discharged from each cylinder.

On the intake air channel 12, an air cleaner 16, a throttle valve 18 and a surge tank 20 are provided in this order from the upstream side. The throttle valve 18 is an electronically controlled valve and adjusts the amount of intake air. The surge tank 20 provides a space having a certain volume in the intake air channel 12 and has a function of attenuating an intake air pulsation. The surge tank 20 is connected at the downstream side thereof to intake ports 24 of the cylinders via a plurality of intake pipes (intake manifolds) 22. The surge tank 20, the intake manifolds 22 and the intake ports 24 form a part of the intake air channel 12. Each cylinder of the engine 10 is provided with an intake port injection valve 26 that injects a fuel into the intake port 24 and an in-cylinder injection valve 28 that injects the fuel directly into a combustion chamber (into the cylinder) as well as an ignition plug 30 (see FIG. 2) that ignites a fuel gas and an intake valve and an exhaust gas that are not shown in the drawing. An alcohol fuel stored in a fuel tank 32 is supplied in the liquid state to the injection valves 26 and 28.

Next, a fuel vaporization system mounted on the engine 10 will be described. A fuel vaporization system according to this embodiment is characterized in that a fuel gas generated during operation of the engine is stored in a tank and used when the engine is started for the next time. The fuel vaporization system includes a fuel gas tank 34, an in-tank injection valve 36, a fuel gas supply valve 38, an atmosphere introducing valve 40 and a relief valve 42, for example.

The fuel gas tank 34 is a pressure-tight vessel having an enclosed structure and is configured to store the fuel gas generated by vaporizing the alcohol fuel in the fuel tank 32. In the engine room, the fuel gas tank 34 is disposed at a position where the heat from the engine 10 is likely to be transferred to the fuel gas tank 34. The in-tank injection valve 36 injects (supplies) the fuel stored in the fuel tank 32 into the fuel gas tank 34 and constitutes in-tank fuel supplying means according to this embodiment. The in-tank injection valve 36 is a common fuel injection valve, which may be the same as the injection valves 26 and 28, and the amount of the fuel injected through the in-tank injection valve 36 is controlled by a control signal. The fuel injected through the in-tank injection valve 36 is vaporized in the fuel gas tank 34 to form the fuel gas.

The fuel gas tank 34 is connected to the surge tank 20 on the downstream side of the throttle valve 18. At the connection, a fuel gas supply valve 38, which is a normally closed solenoid valve or the like, is provided. When the fuel gas supply valve 38 is closed, the fuel gas tank 34 and the surge tank 20 are disconnected from each other, so that the fuel gas can be accumulated in the fuel gas tank 34. When the fuel gas supply valve 38 is open, the tanks 20 and 34 are in communication with each other, and the fuel gas stored in the fuel gas tank 34 is supplied to the surge tank 20.

The fuel gas tank 34 is provided with the atmosphere introducing valve 40 at a position where the atmosphere introducing valve 40 can connect the interior of the tank and the outside space to each other. The atmosphere introducing valve 40 is a normally closed solenoid valve or the like and is designed to open the fuel gas tank 34 to the atmosphere when the valve is open. When the fuel gas is supplied, both the fuel gas supply valve 38 and the atmosphere introducing valve 40 are opened at slightly different times, and the atmosphere is introduced into the fuel gas tank 34 through the atmosphere introducing valve 40 in an amount equal to the amount of the fuel gas supplied. The valves 38 and 40 are kept closed except when the fuel gas is being supplied. The atmosphere introducing valve 40 is connected to the intake air channel 12 at a position between the air cleaner 16 and the throttle valve 18. Consequently, when the atmosphere introducing valve 40 is open, air that is cleaned by the air cleaner 16 and is not affected by an intake air negative pressure is introduced into the fuel gas tank 34.

The fuel gas tank 34 is further provided with the normally closed relief valve 42, which is a check valve or a reed valve, for example. The relief valve 42 relieves the pressure in the fuel gas tank 34 to the outside (into the intake air channel 12, for example) when the pressure exceeds a predetermined working pressure and forms a pressure relief mechanism according to this embodiment. The relief valve 42 has a function of relieving the air in the tank to the outside when the fuel injected into the fuel gas tank 34 is vaporized. The relief valve 42 functions also as a safety valve that prevents the pressure in the fuel gas tank 34 in the enclosed state from being excessively high.

According to this embodiment, the working pressure of the relief valve 42 is set to be approximately equal to the atmospheric pressure or higher than the atmospheric pressure by about several tens kPa. This setting is based on the assumption that the fuel gas tank 34 is kept at room temperature or slightly higher than room temperature, and the saturation vapor pressure of the fuel assumes a value corresponding to the temperature range. Therefore, when the saturation vapor pressure of the fuel is increased by heating or other treatment, the working pressure of the relief valve 42 is preferably increased accordingly. This will be described in detail with regard to an embodiment 2.

Next, a control system of the engine 10 will be described with reference to FIG. 2.

Figure 2:
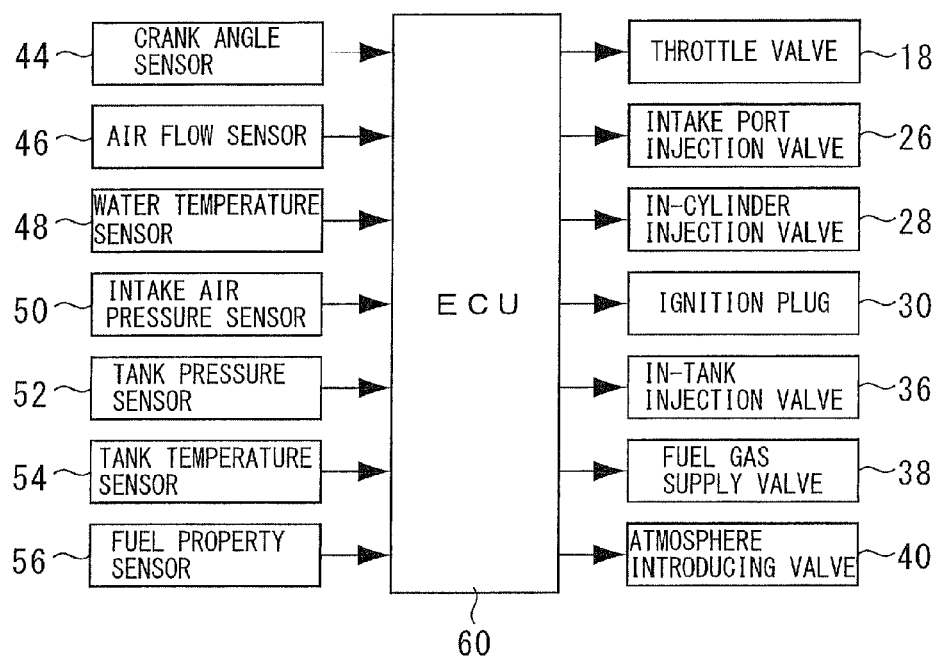
FIG. 2 is a diagram showing a configuration of the control system of the system according to the embodiment 1 of the present invention.

FIG. 2 is a diagram showing a configuration of the control system of the system according to the embodiment 1 of the present invention. As shown in FIG. 2, the system according to this embodiment includes a sensor system including a plurality of sensors 44 to 56 and an electronic control unit (ECU) 60 that controls the operational state of the engine 10. The sensor system will described first. A crank angle sensor 44 outputs a signal in synchronization with a rotation of a crank shaft of the engine 10, and the ECU 60 can detect the number of revolutions of the engine and the crank angle based on the output. An air flow sensor 46 detects the amount of intake air, and a water temperature sensor 48 detects the temperature of an engine cooling water.

An intake air pressure sensor 50 detects the pressure of the intake air at the position of the surge tank 20, for example, and the ECU 60 can detect the pressure in the surge tank 20 based on the output of the intake air pressure sensor 50. A tank pressure sensor 52 detects the pressure in the fuel gas tank 34, and a tank temperature sensor 54 detects the temperature in the fuel gas tank 34. Furthermore, a fuel property sensor 56 detects the alcohol concentration of the fuel as a property of the fuel.

The sensor system includes not only the sensors 44 to 56 described above but also various types of other sensors required for controlling the vehicle or the engine (an air fuel ratio sensor that detects the air fuel ratio of the exhaust gas or an accelerator opening sensor that detects the accelerator opening, for example), and these sensors are connected to the input side of the ECU 60. The present invention does not always require the tank temperature sensor 54 and can also be configured to estimate the temperature in the tank based on the temperature or operation history of the engine, the thermal conductivity to the fuel gas tank 34 or the like without using the tank temperature sensor 54.

On the other hand, to the output side of the ECU 60, various types of actuators including the throttle valve 18, the injection valves 26, 28 and 36, the ignition plug 30, the fuel gas supply valve 38 and the atmosphere introducing valve 40 are connected. The ECU 60 acquires engine operation information from the sensor system and performs an operational control by driving each actuator based on the acquired result. Specifically, the number of revolutions of the engine and the crank angle are detected based on the output of the crank angle sensor 44, and the air flow sensor 46 detects the amount of intake air. In addition, a normal fuel injection control described below is performed, and at the same time, the time of ignition is determined based on the crank angle, and the ignition plug 30 is activated.

The normal fuel injection control is performed during operation of the engine except when a fuel gas supply control described later is performed, and involves a start injection control. In the normal fuel injection control, the amount of fuel injection is calculated based on the amount of intake air, the number of revolutions of the engine, the temperature of the engine cooling water or the like, the time of fuel injection is determined based on the crank angle, and then, the injection valves 26 and 28 are activated. In this process, the ratio between the amount of injection through the intake port injection valve 26 and the amount of injection through the in-cylinder injection valve 28 is variable depending on the property of the fuel or the operational state. In addition, the ECU 60 performs a fuel gas generation control described later and the fuel gas supply control as controls relating to the fuel vaporization system described above.

[Operation according to Embodiment 1]
(Fuel Gas Generation Control)

The fuel gas generation control is to vaporize the fuel in the fuel gas tank 34 during operation of the engine 10 (preferably during operation of the engine 10 after warming up) to generate the fuel gas. More specifically, in the fuel gas generation control, the fuel is injected through the in-tank injection valve 36 in a state where the fuel gas supply valve 38 and the atmosphere introducing valve 40 are open. The injected fuel is quickly vaporized to become the fuel gas while purging the air in the tank through the relief valve 42. Eventually, the fuel gas tank 34 is filled with the fuel gas. Thus, the relief valve 42 can prevent the pressure of the air in the tank from suppressing the vaporization of the fuel and promote the generation of the fuel gas. In addition, the relief valve 42 can reduce the dead volume occupied by air in the tank and increase the density of the fuel gas. As a result, a large amount of fuel gas can be efficiently generated and stored in a compact space.

The fuel gas generation control may be configured to be performed only when the temperature T in the fuel gas tank 34 (the in-tank temperature) is higher than a predetermined fuel injection criterion temperature T1. The fuel injection criterion temperature T1 is set in correspondence with a lower limit value of the temperature at which the fuel gas can be generated and is a criterion temperature based on which fuel injection into the tank is permitted. If the in-tank temperature T is higher than the fuel injection criterion temperature T1, the temperature is high enough for the alcohol fuel to vaporize, the fuel gas generation control is performed. On the other hand, the in-tank temperature T is equal to or lower than the fuel injection criterion temperature T1, the fuel is less likely to vaporize, so that the fuel gas cannot be efficiently generated. Thus, in this case, fuel injection into the fuel gas tank 34 is inhibited, and the fuel gas generation control is stopped.

According to the configuration described above, the fuel gas can be efficiently generated at high temperature, and useless fuel injection at low temperature can be avoided. If the fuel injection criterion temperature T1 is appropriately set so that the fuel gas generation control occurs when the engine is warmed up to some extent, the fuel injected into the tank can be efficiently vaporized because the fuel gas tank 34 is warmed by the heat transferred from the engine.

The volatility of the alcohol fuel varies with the property of the fuel. Thus, the fuel injection criterion temperature T1 may be variable depending on the property of the fuel. More specifically, the higher the alcohol concentration of the fuel, the higher the fuel injection criterion temperature T1 is set. That is, as the alcohol concentration becomes higher, the fuel is less likely to vaporize, so that the temperature range in which the fuel injection occurs is set higher accordingly. In this way, even if the alcohol concentration of the fuel varies, the fuel gas can be always efficiently generated.

According to the fuel gas generation control described above, the fuel gas can be stored in the fuel gas tank 34 during operation of the engine. Even during cold after the engine is stopped, the fuel gas tank 34 can maintain at least part of the fuel gas in the gas phase due to the natural decompression in the tank. Therefore, when the engine is to be restarted, the fuel gas in the tank can be quickly supplied into the cylinders in the fuel gas supply control, and the startability can be improved.

(Fuel Gas Supply Control)

The fuel gas supply control is to open the fuel gas supply vale 38 and the atmosphere introducing valve 40, when the engine is to be started, to supply the fuel gas stored in the fuel gas tank 34 to the surge tank 20. More specifically, since an intake air negative pressure occurs in the surge tank 20 because of cranking at the start of the engine, when the fuel gas supply valve 38 opens, the intake air negative pressure causes supply of the fuel gas in the fuel gas tank 34 to the surge tank 20. The fuel gas supplied into the surge tank 20 flows into the cylinders through the intake ports 24 and ignited and burned in the cylinders. In this way, compared with generation of the fuel gas at the start of the engine, the fuel gas can be supplied into the cylinders in a considerably shorter time. The engine can be quickly started even at low temperature at which the fuel gas is hard to generate.

When the fuel gas is supplied as described above, air flows into the fuel gas tank 34 through the atmosphere introducing valve 40 in an amount equal to the amount of the fuel gas having flows out of the fuel gas tank 34. Since the fuel gas supply valve 38 and the atmosphere introducing valve 40 are associated with each other, the fuel gas can be more smoothly supplied. In addition, since the fuel gas is supplied to the surge tank 20, the fuel gas and air can be mixed in the surge tank 20 having a certain volume, so that a fuel air mixture of high quality can be generated. In order for the fuel gas to smoothly flow out of the fuel gas tank 34, a sufficient intake air negative pressure has to be occur in the surge tank 20, so that the throttle valve 18 is preferably kept closed.

The fuel gas supply control may be configured to be performed only when the engine temperature at the start thereof is lower than a predetermined fuel gas supply criterion temperature. The fuel gas supply criterion temperature is set in correspondence with an upper limit value of the engine temperature at which the fuel gas is required and is a criterion temperature based on which supply of the fuel gas is permitted. If the engine temperature at the start thereof is lower than the fuel gas supply criterion temperature, the fuel injected by intake port injection or in-cylinder injection is hard to vaporize, and the engine is hard to start without using the fuel gas, so that the fuel gas supply control is performed. On the other hand, if the engine temperature at the start thereof is equal to or higher than the fuel gas supply criterion temperature, the fuel injected by intake port injection or in-cylinder injection can be easily vaporized, so that the fuel gas does not have to be used. Thus, in this case, the fuel gas supply control is not performed, and the engine is started by the normal start injection control.

The engine temperature includes various temperature parameters that reflect the temperature state of the engine, including the temperature of the engine cooling water, the temperature of a lubricant, and the temperature of the engine main unit (an engine block or the like). According to this embodiment, the temperature of the engine cooling water (engine water temperature) is used as the engine temperature, for example, and the fuel gas supply valve 38 is opened only when the engine water temperature at the start of the engine is lower than a predetermined fuel gas supply criterion temperature ethw1. In this way, the fuel gas can be efficiently used only when the engine is started at low temperature and thus the fuel gas is required. In addition, the fuel gas can be prevented from being wasted when the engine is started at high temperature.

As the alcohol concentration of the fuel becomes higher, the volatility of the injected fuel becomes lower, so that the fuel gas is preferably supplied in an accordingly higher temperature range. That is, as the alcohol concentration of the fuel becomes higher, the fuel gas supply criterion temperature can be set higher. In this way, the temperature range for using the fuel gas can be appropriately set in accordance with the alcohol concentration of the fuel, and the startability can be stably secured.

The order of opening of the fuel gas supply valve 38 and the atmosphere introducing valve 40, which are both opened when the fuel gas is supplied, is preferably variable depending on the magnitude relationship between the pressure in the fuel gas tank 34 (in-tank pressure) and the atmospheric pressure. More specifically, if the atmosphere introducing valve 40 is opened when an in-tank pressure P is higher than an atmospheric pressure PO, the fuel gas may flow out into the atmosphere. Therefore, under such a condition, the fuel gas supply valve 38 is first opened, and then the atmosphere introducing valve 40 is opened after the fuel gas has flowed to the surge tank 20 and the in-tank pressure has decreased.

On the other hand, when the in-tank pressure P is equal to or lower than the atmospheric pressure P0, the in-tank pressure P can be lower than the pressure in the surge tank 20. If the fuel gas supply valve 38 is opened under such a condition, the air in the surge tank 20 may flow back into the fuel gas tank 34. Thus, under such a condition, the atmosphere introducing valve 40 is first opened, and then the fuel gas supply valve 38 is opened after the in-tank pressure P has increased approximately to the atmospheric pressure. According to the configuration described above, the fuel gas can be prevented from flowing out into the atmosphere, and air can be prevented from flowing into the fuel gas tank 34. Therefore, even when both the fuel gas supply valve 38 and the atmosphere introducing valve 40 are opened, the flow of the fuel gas can be appropriately controlled according to the order of opening of the valves.

[Specific Processings for Implementing Embodiment 1]

Figure 3:
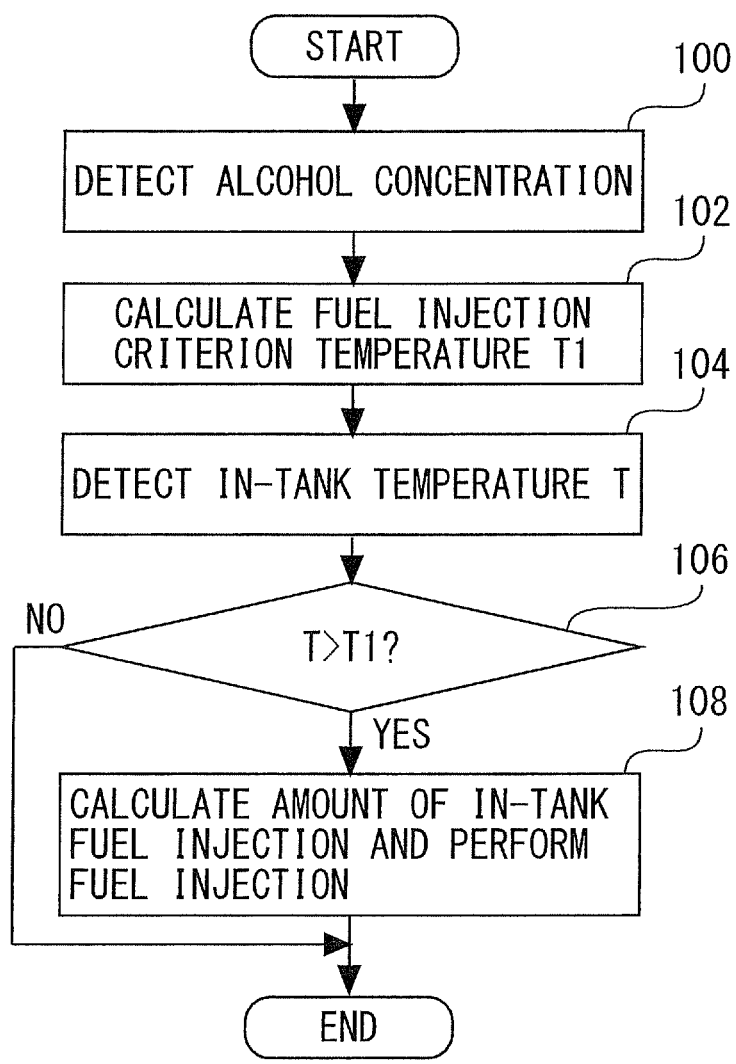
FIG. 3 is a flowchart showing the fuel gas generation control performed by the ECU.

Next, with reference to FIGS. 3 and 4, specific processings for implementing the controls described above will be described. FIG. 3 is a flowchart showing the fuel gas generation control performed by the ECU. The routine shown in FIG. 3 is repeatedly performed during operation of the engine.

According to the routine shown in FIG. 3, first, the alcohol concentration of the fuel is detected based on the output of the fuel property sensor 56 (Step 100). Then, based on the detection value of the alcohol concentration, the fuel injection criterion temperature T1 is calculated (Step 102). The ECU 60 previously stores map data used for setting a higher fuel injection criterion temperature T1 as the alcohol concentration of the fuel becomes higher. The fuel injection criterion temperature T1 can be calculated by referring to the map data.

Then, the tank temperature sensor 54 detects the temperature T in the fuel gas tank 34 (Step 104), and it is determined whether or not the in-tank temperature T is higher than the fuel injection criterion temperature T1 (Step 106). If the result of the determination in Step 106 is positive, the amount of fuel injected into the fuel gas tank 34 is calculated, and the in-tank injection valve 36 is activated in a state where the fuel gas supply valve 38 and the atmosphere introducing valve 40 are closed (Step 108). As a result, the fuel is injected into the fuel gas tank 34 through the in-tank injection valve 36. Note that the amount of fuel injected through the in-tank injection valve 36 is calculated based on the saturation vapor pressure of the fuel, the in-tank temperature T, the volume of the fuel gas tank 34 or the like. An example of the calculation method will be described in detail later with regard to an embodiment 6, for example.

Figure 4:
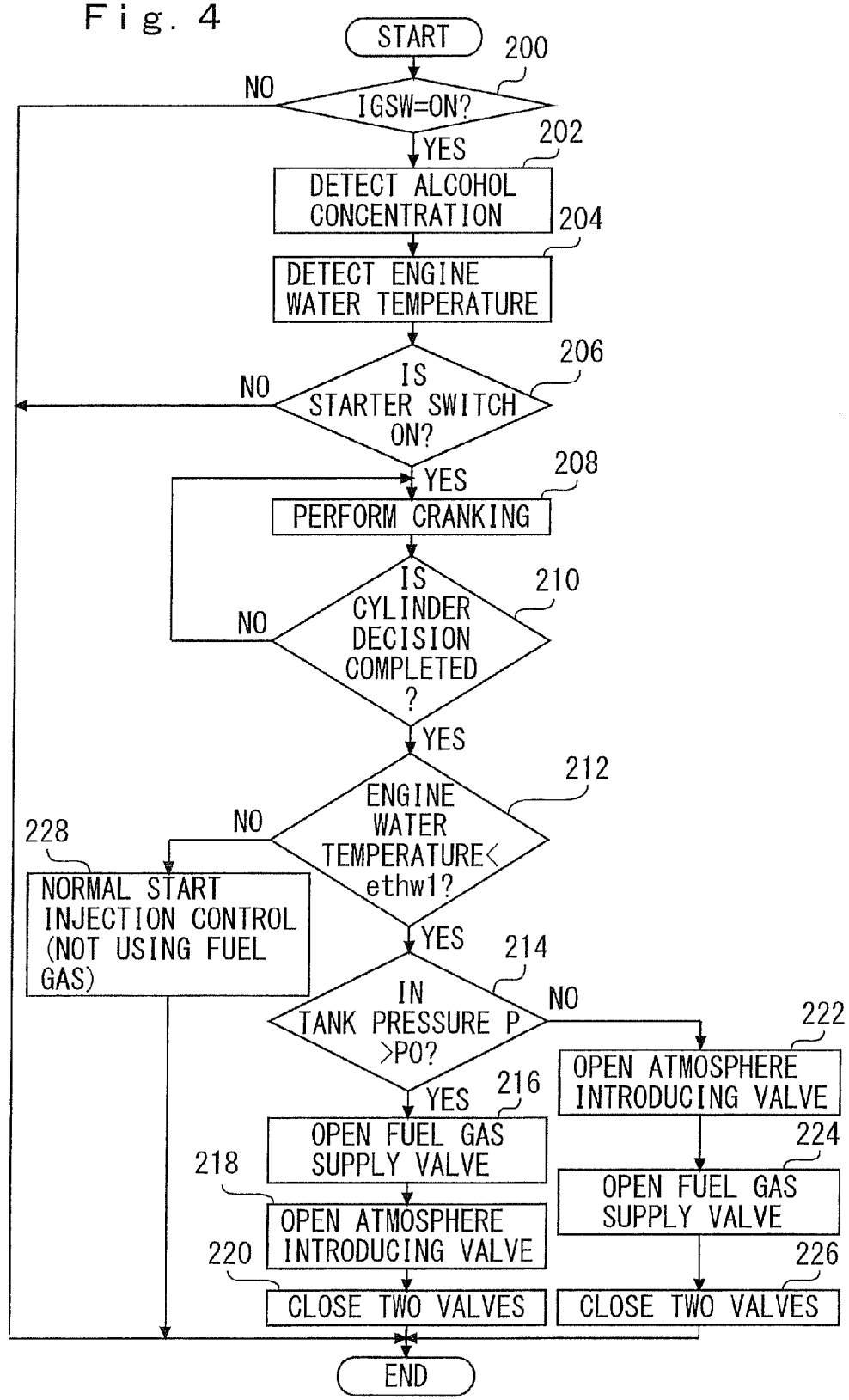
FIG. 4 is a flowchart showing the fuel gas supply control performed by the ECU according to the embodiment 1 of the present invention.

FIG. 4 is a flowchart showing the fuel gas supply control performed by the ECU according to the embodiment 1 of the present invention. The routine shown in FIG. 4 is repeatedly performed during operation of the engine. According to this routine, first, it is determined whether or not an ignition switch (IGSW) is turned on (Step 200), and if the result of the determination is positive, the alcohol concentration of the fuel is detected (Step 202). In addition, the engine water temperature at the start of the engine is detected based on the output of the water temperature sensor 48 (Step 204).

Then, it is determined whether or not a starter switch is turned on (Step 206), and if the result of the determination is positive, cranking is performed to drive a starter motor or the like, and at the same time, a cylinder decision processing is performed (Step 208). Then, it is determined whether or not the cylinder decision processing is completed (Step 210), and if the result of the determination is positive, it is determined whether or not the engine water temperature at the start of the engine is lower than the fuel gas supply criterion temperature ethw1 (Step 212). Here, the processing in Step 212 will be described in more detail. First, the fuel gas supply criterion temperature ethw1 is calculated based on the alcohol concentration of the fuel. The ECU 60 previously stores map data used for setting a higher fuel gas supply criterion temperature ethw1 as the alcohol concentration of the fuel becomes higher. The fuel gas supply criterion temperature ethw1 can be calculated by referring to the map data. Then, the fuel gas supply criterion temperature ethw1 and the engine water temperature are compared.

If the result of the determination in Step 212 is positive, the fuel gas needs to be supplied, so that a process from Steps 214 to 226 is performed. As described above, this process is to supply the fuel gas to the surge tank 20 while changing the order of opening of the fuel gas supply valve 38 and the atmosphere introducing valve 40 according to the magnitude relationship between the in-tank pressure P and the atmospheric pressure P0. Specifically, it is determined whether or not the in-tank pressure P is higher than the atmospheric pressure P0 (Step 214), and if the result of the determination is positive, the fuel gas supply valve 38 is opened before the atmosphere introducing valve 40 is opened, and then, after a sufficient amount of fuel gas to start the engine is supplied, the two valves 38 and 40 are closed (Steps 216 to 220). If the result of the determination in Step 214 is negative, the atmosphere introducing valve 40 is opened before the fuel gas supply valve 38 is opened, and then, the two valves 38 and 40 are closed (Steps 222 to 226). In this way, the fuel gas is supplied from the fuel gas tank 34 into the cylinders through the surge tank 20, the intake ports 24 or the like.

On the other hand, if the result of the determination in Step 212 is negative, the fuel gas does not have to be supplied, so that the normal start injection control is performed, and the fuel is injected through the intake port injection valve 26 and the in-cylinder injection valve 28 (Step 228).

In the embodiment 1 described so far, Steps 100 to 108 shown in FIG. 3 represent a specific example of generation controlling means according to claim 2, and Step 106 represents a specific example of generation controlling means according to claim 3. Steps 200 to 226 shown in FIG. 4 represent a specific example of supply controlling means according to claim 2, and Step 212 represents a specific example of supply controlling means according to claim 4. Steps 214 to 226 represent a specific example of valve opening order changing means.

Embodiment 2

Next, with reference to FIG. 5, an embodiment 2 of the present invention will be described. This embodiment is characterized in that heating means for heating the fuel gas tank is additionally provided. In this embodiment, the same components as those in the embodiment 1 described above are denoted by the same reference numerals, and description thereof will be omitted.

[Characteristics of Embodiment 2]

Figure 5:
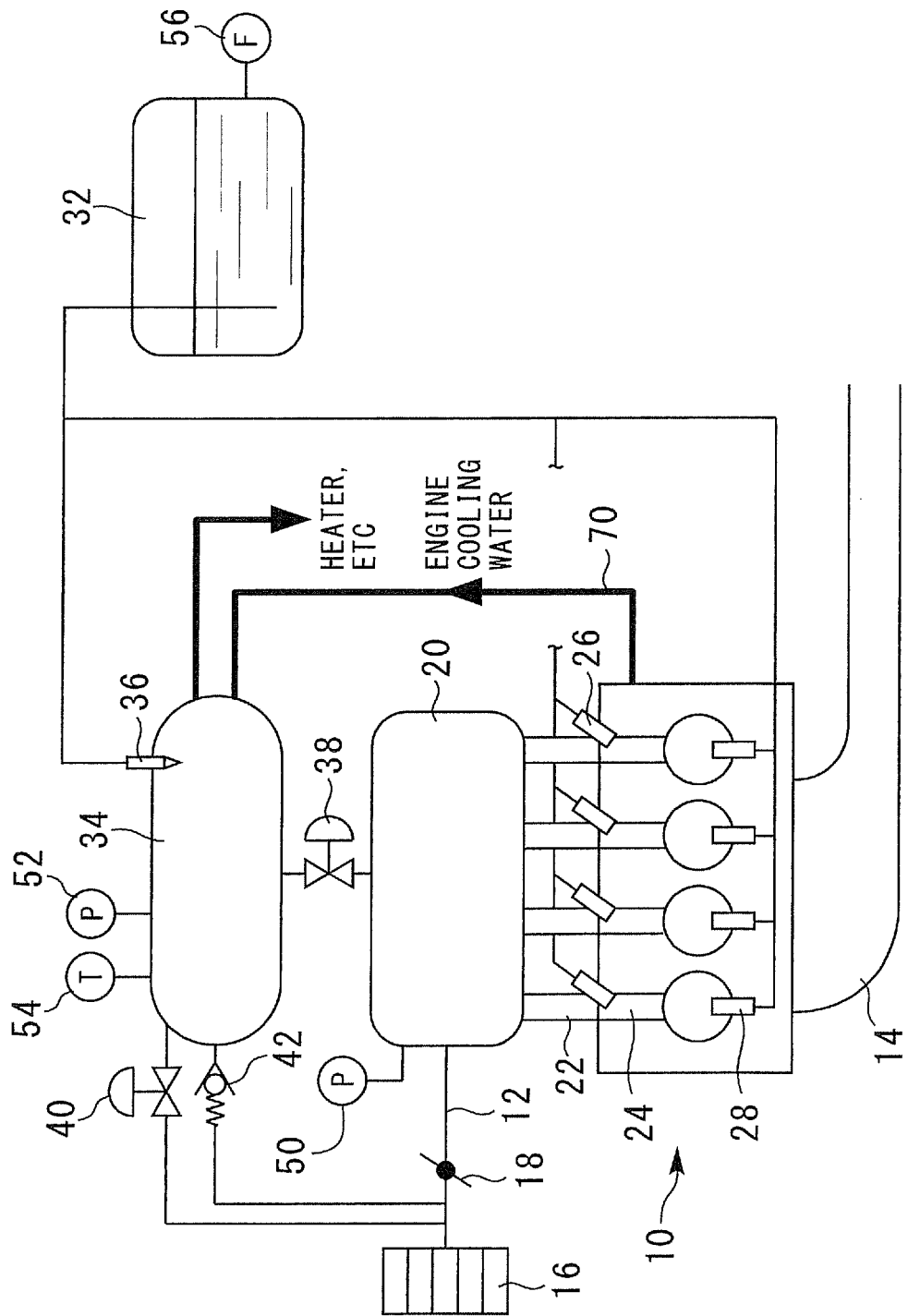
FIG. 5 is a schematic diagram for illustrating a configuration of the whole of a system according to the embodiment 2 of the present invention.

FIG. 5 is a schematic diagram for illustrating a configuration of the whole of a system according to the embodiment 2 of the present invention. As shown in this drawing, according to this embodiment, the fuel gas tank 34 is provided with cooling piping 70 for the engine 10. The cooling piping 70 circulates the engine cooling water (LLC) among the engine main unit, the radiator, an air conditioner (heater) of the vehicle and other equipment and, according to this embodiment, is also configured to circulate the engine cooling water to the fuel gas tank 34. Thus, the cooling piping 70 constitutes heating means that heats the fuel gas tank 34 with the heat generated by the engine 10. According to the present invention, the heating means does not necessarily use the heat from the engine but can also be an electric heater or the like.

This embodiment configured as described above can provide substantially the same effects and advantages as those of the embodiment 1. According to this embodiment, in particular, the fuel gas tank 34 can be actively heated with the hot engine cooling water during operation of the engine. As a result, during generation of the fuel gas, the energy of the latent heat of vaporization of the fuel can be readily provided by the heat generated by the engine, so that the vaporization of the fuel can be promoted. In addition, since the heat from the engine is used, an extra electric or other energy is not needed for heating, so that the operational efficiency can be improved.

The maximum amount of the fuel gas that can be stored in the fuel gas tank 34 is limited by the saturation vapor pressure of the fuel. According to this embodiment, however, since the fuel gas tank 34 is heated, the saturation vapor pressure of the fuel can be increased to increase the vapor density of the fuel in the tank. Therefore, a larger amount of fuel gas can be stored in the fuel gas tank 34 of the same volume. In other words, the volume of the fuel gas tank 34 that stores the same amount of fuel gas can be reduced. To achieve this effect, the working pressure of the relief valve 42 is preferably set higher in accordance with the expected vapor pressure of the fuel gas. This allows the high pressure fuel gas to be stably held in the tank.

Embodiment 3

Next, with reference to FIG. 6, an embodiment 3 of the present invention will be described. This embodiment is characterized in that heating means different from the heating means according to the embodiment 2 described above is provided. In this embodiment, the same components as those in the embodiment 1 described above are denoted by the same reference numerals, and description thereof will be omitted.

[Characteristics of Embodiment 3]

Figure 6:
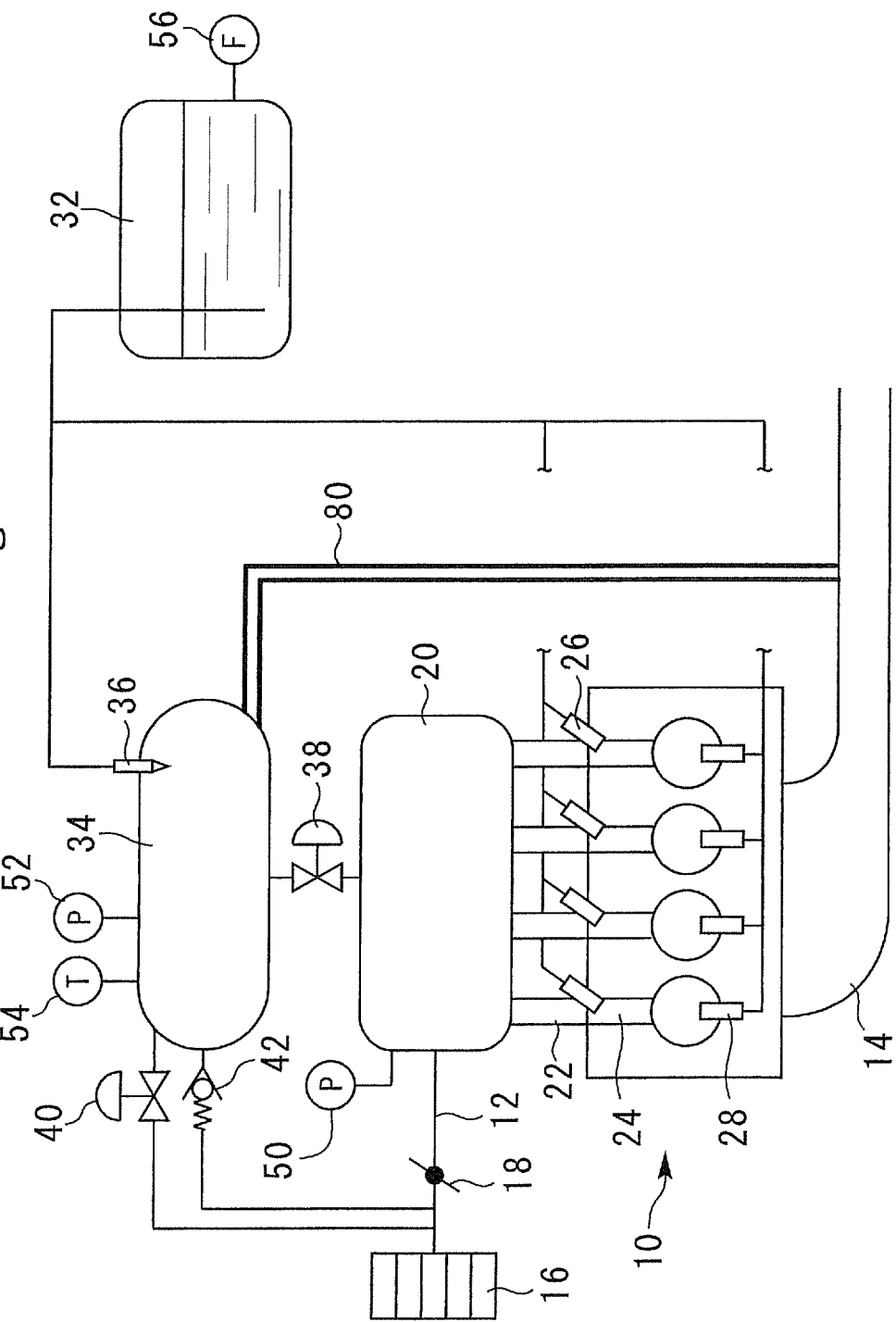
FIG. 6 is a schematic diagram for illustrating a configuration of the whole of a system according to the embodiment 3 of the present invention.

FIG. 6 is a schematic diagram for illustrating a configuration of the whole of a system according to the embodiment 3 of the present invention. As shown in this drawing, according to this embodiment, a heat pipe 80 is provided between the fuel gas tank 34 and the exhaust gas channel 14 of the engine 10. The heat pipe 80 constitutes heating means that heats the fuel gas tank 34 with the heat generated by the engine 10. More specifically, the heat pipe 80 includes a pipe made of a material having a high heat conductivity, such as metal, and a volatile liquid (working fluid) sealed in the pipe. While circulating in the pipe, the working fluid repeatedly vaporizes by absorbing the heat of the exhaust gas at the exhaust gas channel 14 and liquefies by releasing the heat at the fuel gas tank 34. According to the present invention, the heat pipe does not necessarily include the working fluid but can include only the pipe member for heat conduction without the working fluid sealed therein.

This embodiment configured as described above can provide substantially the same effects and advantages as those of the embodiments 1 and 2. According to this embodiment, in particular, the fuel gas tank 34 can be actively heated with the heat of the exhaust gas from the engine by using the working fluid in the heat pipe 80 as a medium. As a result, the temperature of the fuel gas tank 34 can be higher than the temperature in the case where the engine cooling water is used. Therefore, the vapor density of the fuel can be further increased, and the effects provided by the embodiment 2 can be more remarkably provided.

Embodiment 4

Next, with reference to FIG. 7, an embodiment 4 of the present invention will be described. This embodiment is characterized in that the relief valve is omitted. In this embodiment, the same components as those in the embodiment 2 described above are denoted by the same reference numerals, and description thereof will be omitted.

[Characteristics of Embodiment 4]

Figure 7:
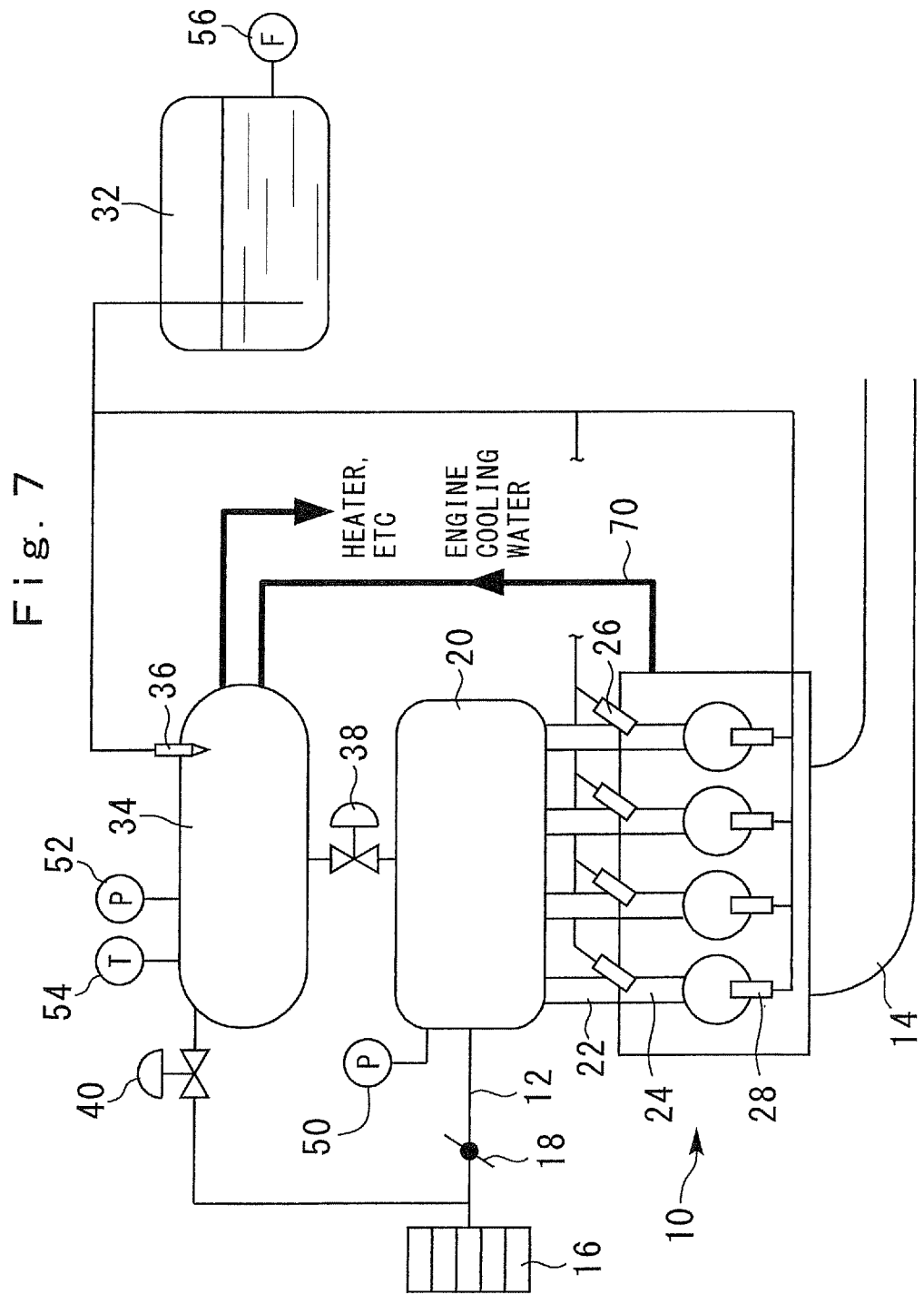
FIG. 7 is a schematic diagram for illustrating a configuration of the whole of a system according to the embodiment 4 of the present invention.

FIG. 7 is a schematic diagram for illustrating a configuration of the whole of a system according to the embodiment 4 of the present invention. As shown in this drawing, according to this embodiment, the relief valve 42 in the configuration according to the embodiment 2, for example, is omitted. Thus, the ECU 60 provides the function of the relief valve 42 by controlling the atmosphere introducing valve 40. That is, the ECU 60 opens the atmosphere introducing valve 40 to supply the fuel gas from the fuel gas tank 34 to the surge tank 20 or when the pressure in the fuel gas tank 34 exceeds the withstanding pressure of the tank.

This embodiment configured as described above can also provide substantially the same effects and advantages as those of the embodiments 1 and 2. According to this embodiment, in particular, since the relief valve 42 is omitted, the number of components of the system and therefore the cost can be reduced.

Embodiment 5

Next, with reference to FIG. 8, an embodiment 5 of the present invention will be described. This embodiment adopts substantially the same configuration and controls as those according to the embodiment 1 described above (see FIGS. 1, 2 and 3) but is characterized in that the fuel gas is used only for combustion in the first cycle at the start of the engine. In this embodiment, the same components as those in the embodiment 1 are denoted by the same reference numerals, and description thereof will be omitted.

[Characteristics of Embodiment 5]

In cold start, in the first combustion (the combustion in the first cycle) after the cylinder decision processing is completed, the temperature of the combustion chamber is low, so that the fuel gas has to be supplied. However, in the combustion in the second and subsequent cycles, the temperature of the combustion chamber has been raised by the heat generated in the first combustion, so that the fuel more easily vaporizes. Therefore, according to this embodiment, the fuel gas is supplied only for the combustion in the first cycle at the start of the engine, and the fuel is injected through the in-cylinder injection valve 28 for the combustion in the second and subsequent cycles. If necessary, the fuel can be additionally injected through the intake port injection valve 26 for the combustion in the second and subsequent cycles.

[Specific processings for Implementing Embodiment 5]

Next, with reference to FIG. 8, specific processings for implementing the control described above will be described. FIG. 8 is a flowchart showing the control performed by the ECU according to the embodiment 5 of the present invention. The routine shown in this drawing is repeatedly performed during operation of the engine, instead of the routine shown in FIG. 4 according to the embodiment 1 described above.

Figure 8:
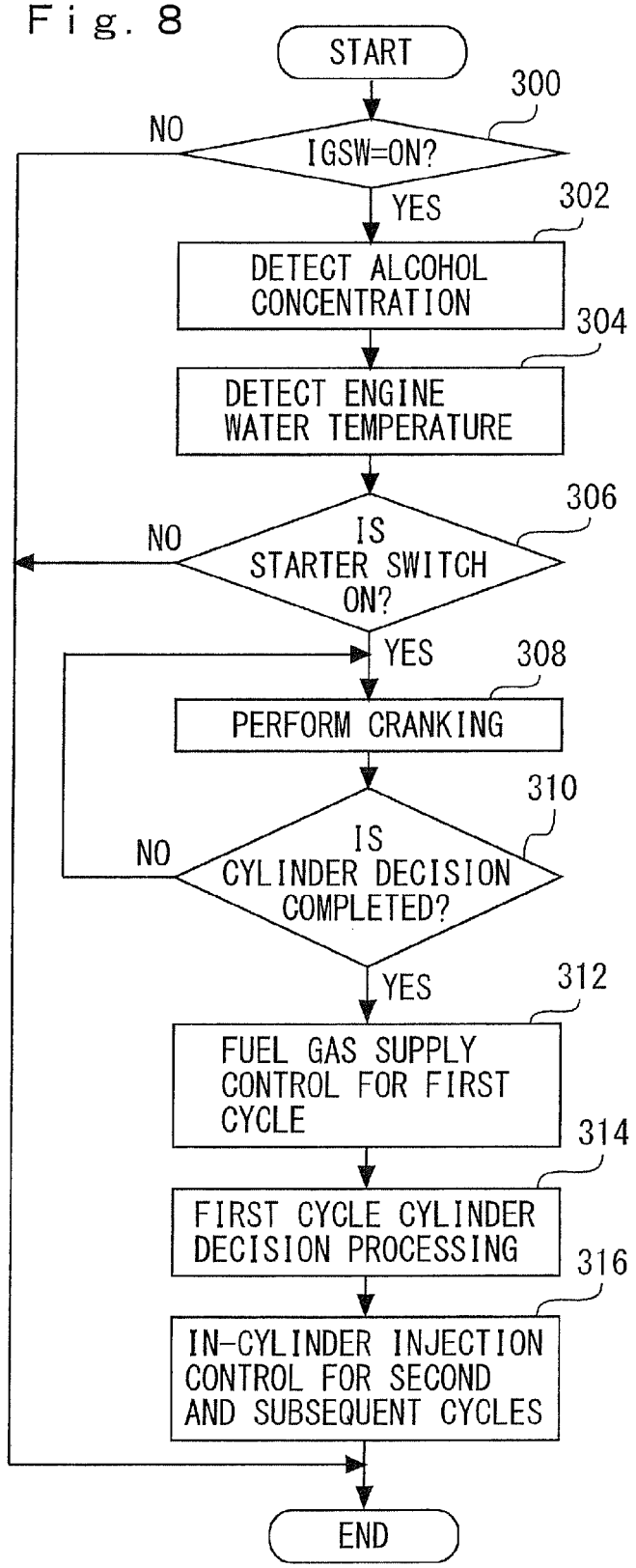
FIG. 8 is a flowchart showing the control performed by the ECU according to the embodiment 5 of the present invention.

According to the routine shown in FIG. 8, first, in Steps 300 to 310, the same processings as those in Steps 200 to 210 shown in FIG. 4 are performed. Then, once the cylinder decision processing is completed, combustion in the first cycle occurs in each cylinder, and thus, the fuel gas supply control for the first cycle is performed (Step 312). More specifically, in Step 312, the same processings as those in Steps 212 to 228 shown in FIG. 4 are performed.

The next processing is to perform a first cycle cylinder decision processing (Step 314). This decision processing is to determine whether or not the combustion stroke in the first cycle is completed in all the cylinders. If the result of the determination in Step 314 is negative, there is a cylinder in which the first combustion stroke has not occurred yet, so that the fuel gas supply control continues. If the result of the determination in Step 314 is positive, the fuel gas supply control is ended, and the in-cylinder injection control for the second and subsequent cycles is performed (Step 316).

This embodiment configured as described above can also provide substantially the same effects and advantages as those of the embodiment 1. According to this embodiment, in particular, the fuel gas can be burned with reliability at low temperature in the combustion in the first cycle. In addition, in the combustion in the second and subsequent cycles, the fuel can be directly injected into the cylinders whose temperatures have been raised because of the first combustion, so that the injected fuel can be smoothly vaporized. As a result, the amount of the fuel gas used can be reduced, while achieving a stable continuous combustion and securing high startability. In the embodiment 5 described so far, Steps 312 to 316 shown in FIG. 8 represent a specific example of fuel form switching means according to claim 5.

Embodiment 6

Next, with reference to FIGS. 9 and 10, an embodiment 6 of the present invention will be described. This embodiment adopts substantially the same configuration and controls as those according to the embodiment 1 described above (see FIGS. 1, 2 and 4) but is characterized in that the amount of fuel injection is calculated based on the saturation vapor pressure. In this embodiment, the same components as those in the embodiment 1 are denoted by the same reference numerals, and description thereof will be omitted.

[Characteristics of Embodiment 6]

To efficiently use the volume of the fuel gas tank 34, the tank preferably stores the maximum amount of fuel gas. However, if an excessive amount of fuel is injected into the tank, some of the injected fuel may fail to vaporize, or the pressure of the generated fuel gas may exceed the withstanding pressure of the tank. In view of this, according to this embodiment, the saturation vapor pressure Pg of the fuel is first calculated based on the alcohol concentration of the fuel and the in-tank temperature T. Then, based on the saturation vapor pressure Pg, the in-tank temperature t and the volume of the fuel gas tank 34, the optimum amount of fuel to be injected into the tank (the optimal amount of fuel supply) Q is calculated.

Since the saturation vapor pressure Pg is a vapor pressure in a state where as much as possible of the fuel is vaporized, if the amount of fuel injection Q is calculated according to the calculation method described above, and the fuel is injected into the fuel gas tank 34 in the calculated amount of fuel injection, the maximum amount of fuel gas can be generated in the tank. Here, the calculation method will be described more specifically. The ECU 60 previously stores map data shown in FIG. 9. FIG. 9 is a characteristics graph showing relationships among the alcohol concentration of the fuel, the in-tank temperature and the saturation vapor pressure according to the embodiment 6 of the present invention. The ECU 60 can calculate the saturation vapor pressure Pg of the fuel at any alcohol concentration and any in-tank temperature by referring to the map data.

The ECU 60 also previously stores map data used for calculating the amount of fuel injection Q based on the saturation vapor pressure Pg, the in-tank temperature T and the volume of the fuel gas tank 34. The map data for calculating the amount of injection fuel can be easily determined by experiment, for example. Since the volume of the tank is a fixed value determined in design, the volume of the tank can be previously stored in the ECU 60 or reflected in the map data for calculating the amount of fuel injection. The ECU 60 can calculate the optimum value of the amount of fuel injection Q at any saturation vapor pressure Pg and any in-tank temperature T by referring to the map data for calculating the amount of fuel injection.

However, the amount of fuel injection Q calculated in this way is a theoretical optimum value, and in practice, the vapor pressure of the generated fuel gas needs to be equal to or lower than a withstanding pressure Ptmax of the fuel gas tank 34. Thus, according to this embodiment, in the process of calculating the amount of fuel injection Q, the amount of fuel injection is prevented from being calculated based on the saturation vapor pressure Pg when the saturation vapor pressure Pg is higher than the withstanding pressure of the fuel gas tank 34. More specifically, when the ECU 60 calculates the amount of fuel injection Q, the ECU 60 refers to the map data for calculating the amount of fuel injection based on the smaller value of the calculated saturation vapor pressure Pg and the withstanding pressure Ptmax of the tank, the in-tank temperature T and the volume of the fuel gas tank 34.

Figure 9:
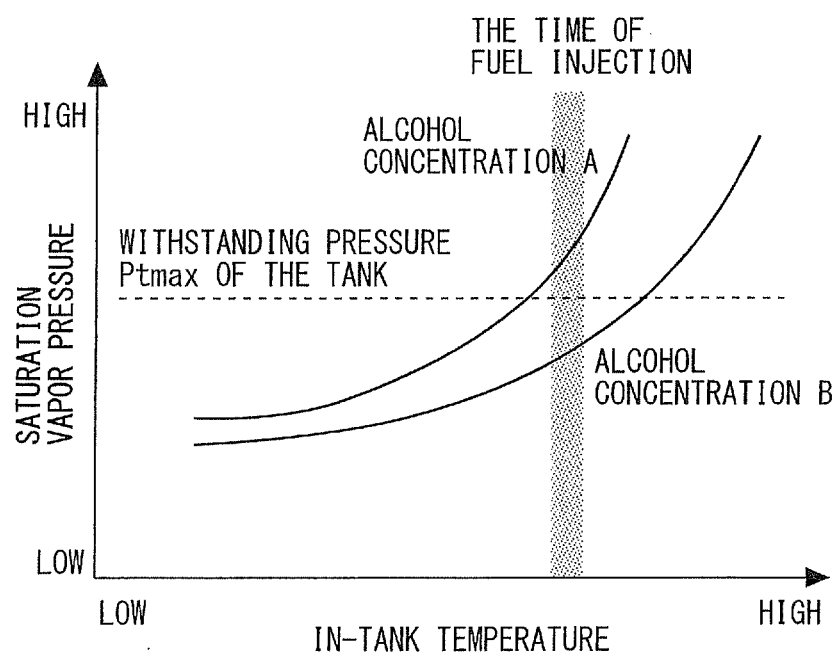
FIG. 9 is a characteristics graph showing relationships among the alcohol concentration of the fuel, the in-tank temperature and the saturation vapor pressure according to the embodiment 6 of the present invention.

For example, in the case where the amount of fuel injection Q is calculated at the time of fuel injection shown in FIG. 9, the saturation vapor pressure Pg of the fuel having an alcohol concentration A is higher than the withstanding pressure Ptmax of the tank, and therefore, the amount of fuel injection for the fuel having the alcohol concentration A is calculated based on the withstanding pressure Ptmax. On the other hand, the saturation vapor pressure Pg of the fuel having an alcohol concentration B is lower than the withstanding pressure Ptmax, the amount of fuel injection for the fuel having the alcohol concentration B is calculated based on the saturation vapor pressure Pg. According to this configuration, even if the fuel in the amount of fuel injection Q completely vaporizes, the vapor pressure can be kept to be equal to or lower than the withstanding pressure Ptmax of the tank.

[Specific processings for Implementing Embodiment 6]

Next, with reference to FIG. 10, specific processings for implementing the control described above will be described. FIG. 10 is a flowchart showing the control performed by the ECU according to the embodiment 6 of the present invention. The routine shown in this drawing is repeatedly performed during operation of the engine, instead of the routine shown in FIG. 3 according to the embodiment 1 described above.

Figure 10:
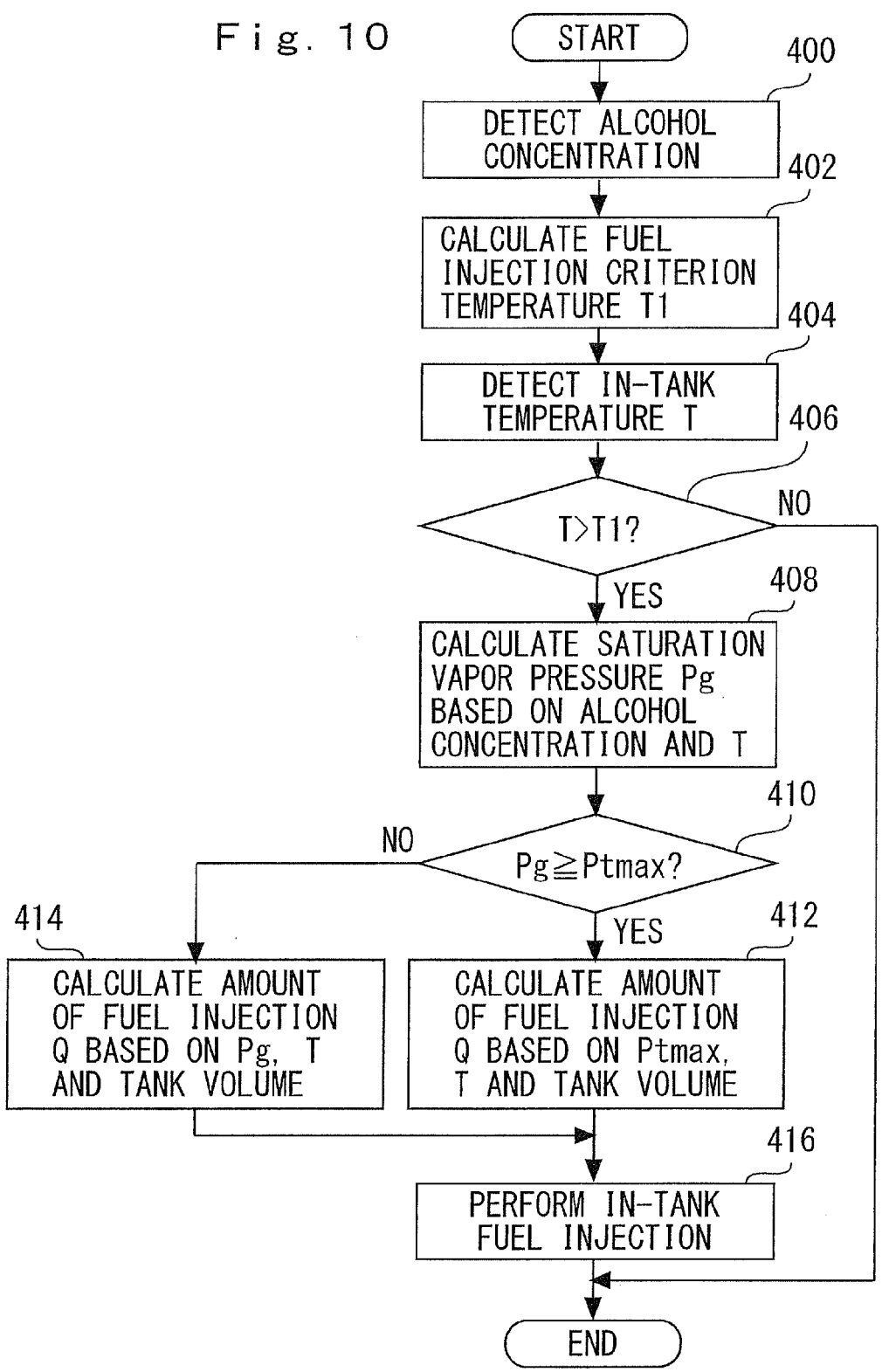
FIG. 10 is a flowchart showing the control performed by the ECU according to the embodiment 6 of the present invention.

According to the routine shown in FIG. 10, first, in Steps 400 to 406, the same processings as those in Steps 100 to 106 shown in FIG. 3 described above are performed. Then, the saturation vapor pressure Pg is calculated by referring to the map data shown in FIG. 9 based on the alcohol concentration of the fuel and the in-tank temperature T (Step 408). Then, it is determined whether or not the saturation vapor pressure Pg is equal to or higher than the withstanding pressure Ptmax of the fuel gas tank 34 (Step 410). The value of the withstanding pressure Ptmax is previously stored in the ECU 60. If the result of the determination in Step 410 is positive, the saturation vapor pressure Pg cannot be used for calculation of the amount of fuel injection, so that the amount of fuel injection Q is calculated by referring to the map data for calculating the amount of fuel injection based on the withstanding pressure Ptmax, the in-tank temperature T and the volume of the tank (Step 412).

If the result of the determination in Step 410 is negative, the amount of fuel injection Q is calculated by referring to the map data for calculating the amount of fuel injection based on the saturation vapor pressure Pg, the in-tank temperature T and the volume of the tank (Step 414). Then, based on the amount of fuel injection Q calculated in Step 412 or 414, the fuel is injected into the fuel gas tank 34 (Step 416).

This embodiment configured as described above can also provide substantially the same effects and advantages as those of the embodiment 1. According to this embodiment, in particular, the maximum amount of fuel gas permitted by the withstanding pressure Ptmax of the fuel gas tank 34 can be generated and stored, so that the volume of the tank can be efficiently used while protecting the fuel gas tank 34.

In the embodiment 6 described so far, Step 408 shown in FIG. 10 represents a specific example of saturation vapor pressure calculating means according to claim 10, and Step 414 represents a specific example of fuel supply amount calculating means. Steps 410 and 412 represent a specific example of limiting means according to claim 11.

Embodiment 7

Next, with reference to FIG. 11, an embodiment 7 of the present invention will be described. This embodiment is characterized in that the embodiment 6 described above is modified so that fuel injection occurs only when the saturation vapor pressure of the fuel is equal to the withstanding pressure of the fuel gas tank. In this embodiment, the same components as those in the embodiment 1 described above are denoted by the same reference numerals, and description thereof will be omitted.

[Characteristics of Embodiment 7]

This embodiment is substantially the same as the embodiment 6 in that the saturation vapor pressure Pg of the fuel is calculated, and the amount of fuel injection Q is calculated based on the calculated value. However, according to this embodiment, the calculation of the amount of fuel injection Q and the fuel injection are performed only when the saturation vapor pressure Pg is equal to the withstanding pressure Ptmax of the fuel gas tank 34, and in the other cases, the fuel injection is not performed to wait the time to come. In this way, according to this embodiment, the amount of fuel injection is prevented from being calculated based on the saturation vapor pressure Pg when the saturation vapor pressure Pg is higher than the withstanding pressure Ptmax of the fuel gas tank 34. Although the condition for performing fuel injection is that the saturation vapor pressure Pg is equal to the withstanding pressure Ptmax according to this embodiment, the present invention is not limited to this, and the calculation of the amount of fuel injection Q and the fuel injection can also be performed when the saturation vapor pressure Pg is equal to or lower than the withstanding pressure Ptmax of the fuel gas tank 34, and the difference between the two pressures is equal to or smaller than a predetermined value.

[Specific processings for Implementing Embodiment 7]

Next, with reference to FIG. 11, specific processings for implementing the control described above will be described. FIG. 11 is a flowchart showing the control performed by the ECU according to the embodiment 7 of the present invention. The routine shown in this drawing is repeatedly performed during operation of the engine, instead of the routine shown in FIG. 3 according to the embodiment 1 described above.

Figure 11:
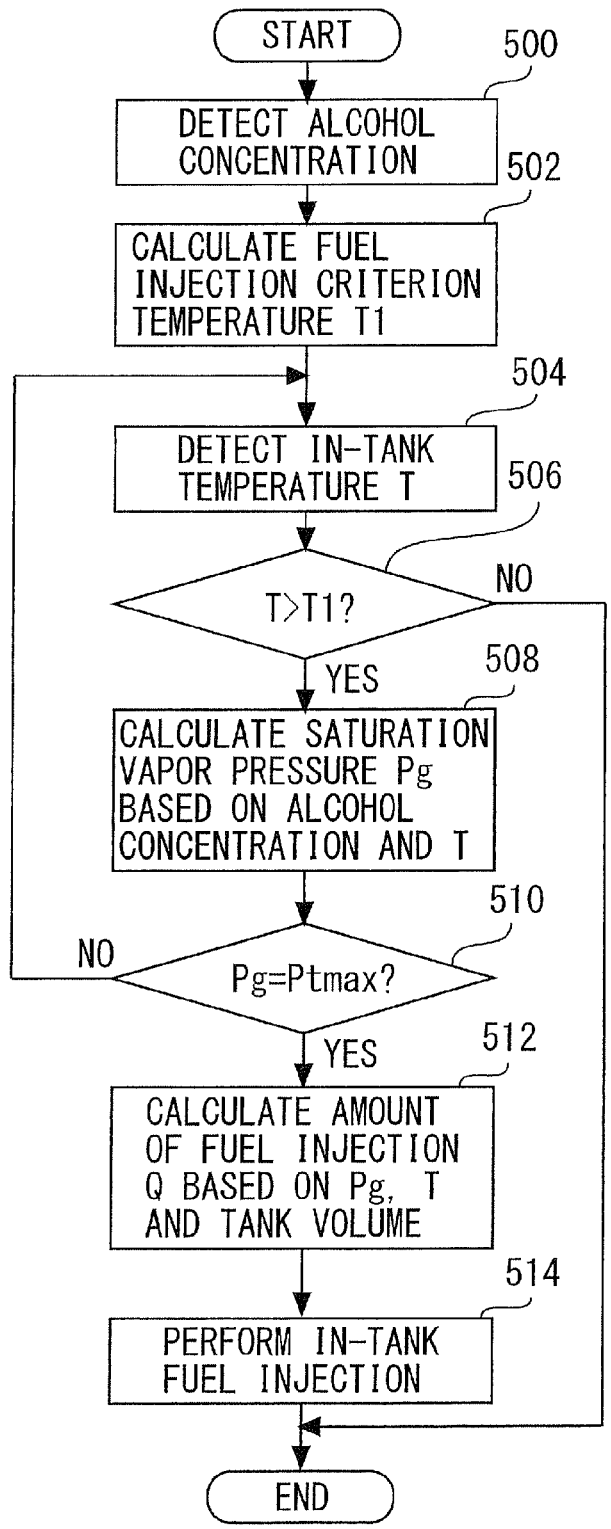
FIG. 11 is a flowchart showing the control performed by the ECU according to the embodiment 7 of the present invention.

According to the routine shown in FIG. 11, first, in Steps 500 to 508, the same processings as those in Steps 400 to 408 according to the embodiment 6 described above (FIG. 10) are performed. Then, it is determined whether or not the saturation vapor pressure Pg is equal to the withstanding pressure Ptmax of the fuel gas tank 34 (Step 510). If the result of the determination in Step 510 is positive, the amount of fuel injection Q is calculated in the same processings as those in Steps 414 and 416 shown in FIG. 10 described above, and the fuel is injected into the tank (Steps 512 and 514). On the other hand, if the result of the determination in Step 510 is negative, the process returns to the processing in Step 504. In this case, the processings in Steps 504 to 510 are repeatedly performed until the saturation vapor pressure Pg becomes equal to the withstanding pressure Ptmax or the result of the determination in step S506 is negative.

This embodiment configured as described above can also provide substantially the same effects and advantages as those of the embodiments 1 and 6. According to this embodiment, in particular, the fuel injection occurs only when the saturation vapor pressure Pg is equal to the withstanding pressure Ptmax, so that the fuel gas can be efficiently generated.

In the embodiment 7 described so far, Step 508 shown in FIG. 11 represents a specific example of the saturation vapor pressure calculating means according to claim 10, and Step 512 represents a specific example of the fuel supply amount calculating means. Step 510 represents a specific example of the limiting means according to claim 11.

Embodiment 8

Next, with reference to FIGS. 12 to 14, an embodiment 8 of the present invention will be described. This embodiment is characterized in that the embodiment 6 described above is modified so that the fuel gas supply valve is opened when the pressure in the fuel gas tank becomes equal to or higher than the withstanding pressure. In this embodiment, the same components as those in the embodiment 1 described above are denoted by the same reference numerals, and description thereof will be omitted.

[Characteristics of Embodiment 8]

This embodiment is substantially the same as the embodiment 6 in that the saturation vapor pressure Pg of the fuel is calculated, the amount of fuel injection Q is calculated based on the calculated value, and fuel injection is performed. However, according to this embodiment, when the in-tank pressure P becomes equal to or higher than the withstanding pressure Ptmax after the fuel injection, the fuel gas supply valve 38 is opened to relieve the pressure in the tank through the fuel gas supply valve 38. According to this configuration, even if the fuel is injected based on the saturation vapor pressure Pg when the saturation vapor pressure Pg is equal to or higher than the withstanding pressure Ptmax, the pressure in the tank can be reduced after the injection. Although the fuel gas supply valve 38 is opened when the pressure in the tank increases according to this embodiment, the atmosphere introducing valve 40 may be opened instead of the fuel gas supply valve 38 according to the present invention.

[Specific processings for Implementing Embodiment 8]

Next, with reference to FIG. 12, specific processings for implementing the control described above will be described. FIG. 12 is a flowchart showing the control performed by the ECU according to the embodiment 8 of the present invention. The routine shown in this drawing is repeatedly performed during operation of the engine, instead of the routine shown in FIG. 3 according to the embodiment 1 described above.

Figure 12:
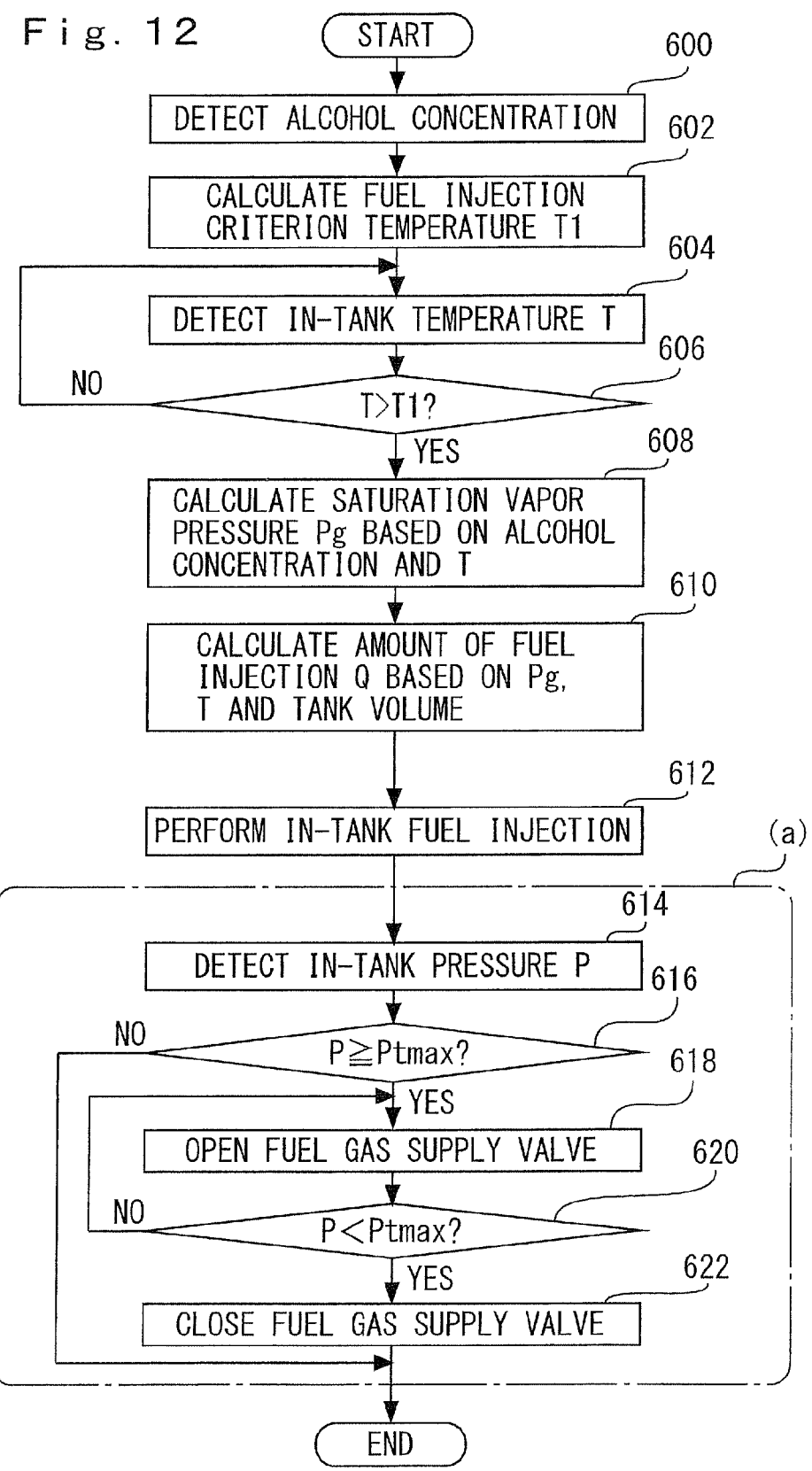
FIG. 12 is a flowchart showing the control performed by the ECU according to the embodiment 8 of the present invention.

According to the routine shown in FIG. 12, first, in Steps 600 to 608, substantially the same processings as those in Steps 400 to 408 according to the embodiment 6 described above (FIG. 10) are performed. However, in Step 606, if the in-tank temperature T is equal to or lower than the fuel injection criterion temperature T1, the process returns to Step 604. In Steps 610 and 612, the amount of fuel injection Q is calculated, and the fuel is injected into the tank in the same processings as those in Steps 414 and 416 shown in FIG. 10 described above.

Then, the in-tank pressure P is detected (Step 614), and it is determined whether or not the in-tank pressure P is equal to or higher than the withstanding pressure Ptmax of the tank (Step 616). If the result of the determination in Step 616 is positive, it can be considered that the in-tank pressure P has excessively increased because of the vaporization of the injected fuel. Thus, in this case, the fuel gas supply valve 38 is opened (Step 618), and then, it is determined whether or not the in-tank pressure P has decreased to be lower than the withstanding pressure Ptmax as a result of the opening of the valve (Step 620). If the result of the determination in Step 620 is positive, the fuel gas supply valve 38 is closed (Step 622). If the result of the determination in Step 620 is negative, the fuel gas supply valve 38 is kept open until the result of the determination in Step 620 is positive.

This embodiment configured as described above can also provide substantially the same effects and advantages as those of the embodiments 1 and 6. According to this embodiment, in particular, even if the actual vapor pressure of the fuel gas increases to be higher than expected because of a calculation error of the saturation vapor pressure Pg or the amount of fuel injection Q, for example, the pressure in the tank can be limited with reliability to protect the fuel gas tank 34.

(First Modification)

Figure 13:
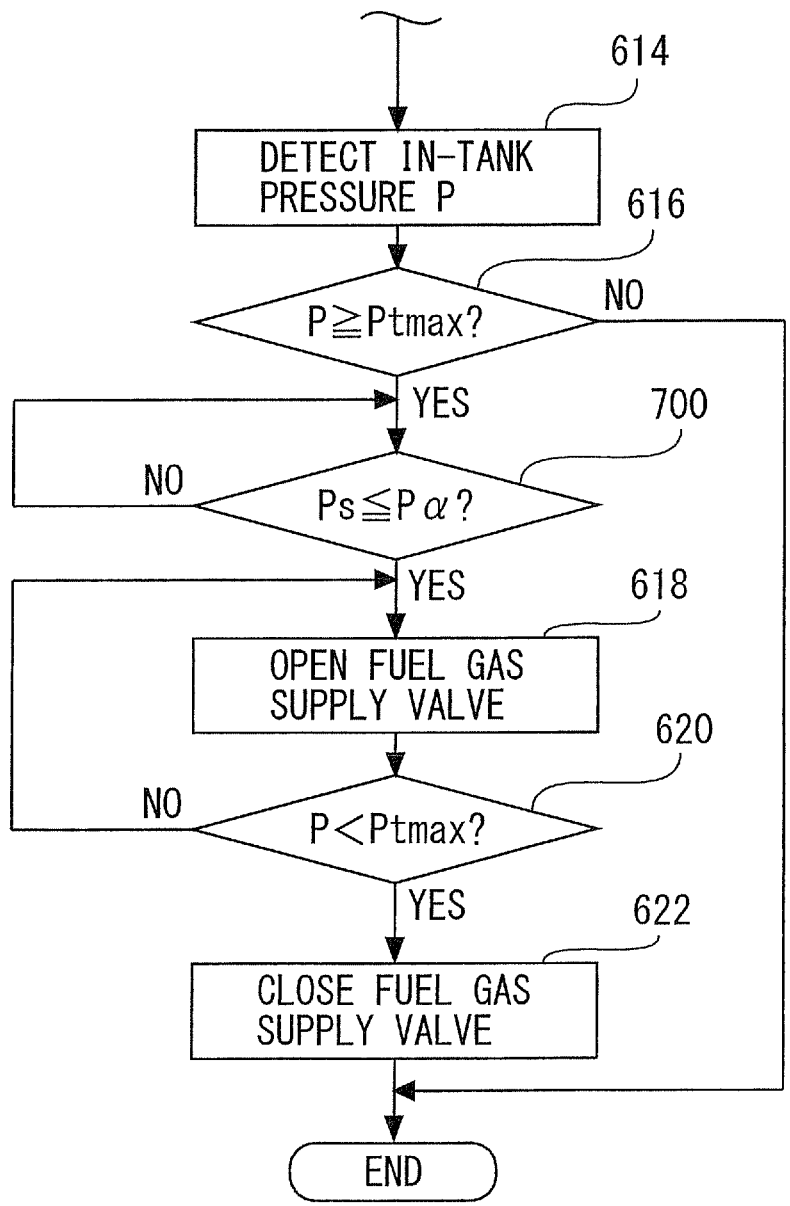
FIG. 13 is a flowchart showing the first modification of the control shown in FIG. 12 according to the embodiment 8 of the present invention.

This embodiment can be configured as shown in FIG. 13, which shows a first modification. FIG. 13 is a flowchart showing the first modification of the control shown in FIG. 12 according to the embodiment 8 of the present invention. This drawing shows only the part (a) of FIG. 12. The first modification consists in adding Step 700 to the process shown in FIG. 12, and therefore, description of the processings in the other steps will be omitted.

As shown in FIG. 13, according to the first modification, after it is determined that the in-tank pressure P is equal to or higher than the withstanding pressure Ptmax and before the fuel gas supply valve 38 is opened, it is determined whether or not a pressure Ps in the surge tank 20 is equal to or lower than a predetermined value Pa (Step 700). The pressure Ps in the surge tank 20 can be calculated based on the output of the intake air pressure sensor 50 or estimated based on the number of revolutions, the load or the like of the engine. The predetermined value Pa is set in correspondence with the lower limit value of the in-tank pressure that varies with the vaporization state of the fuel and is previously stored in the ECU 60.

According to the first modification, if the result of the determination in Step 700 is positive, it is determined that the pressure in the surge tank 20 is certainly lower than the pressure in the fuel gas tank 34, and the fuel gas supply valve 38 is opened. In this way, the pressure in the fuel gas tank 34 can be relieved to the surge tank 20 with reliability. On the other hand, if the result of the determination in Step 700 is negative, the pressure in the fuel gas tank 34 can be higher than the pressure in the surge tank 20, so that the fuel gas supply valve 38 is not opened, and it is waited for the result of the determination in Step 700 to be positive. In this way, a backflow of air from the surge tank 20 to the fuel gas tank 34 can be prevented when the fuel gas supply valve 38 is opened.

(Second Modification)

Figure 14:
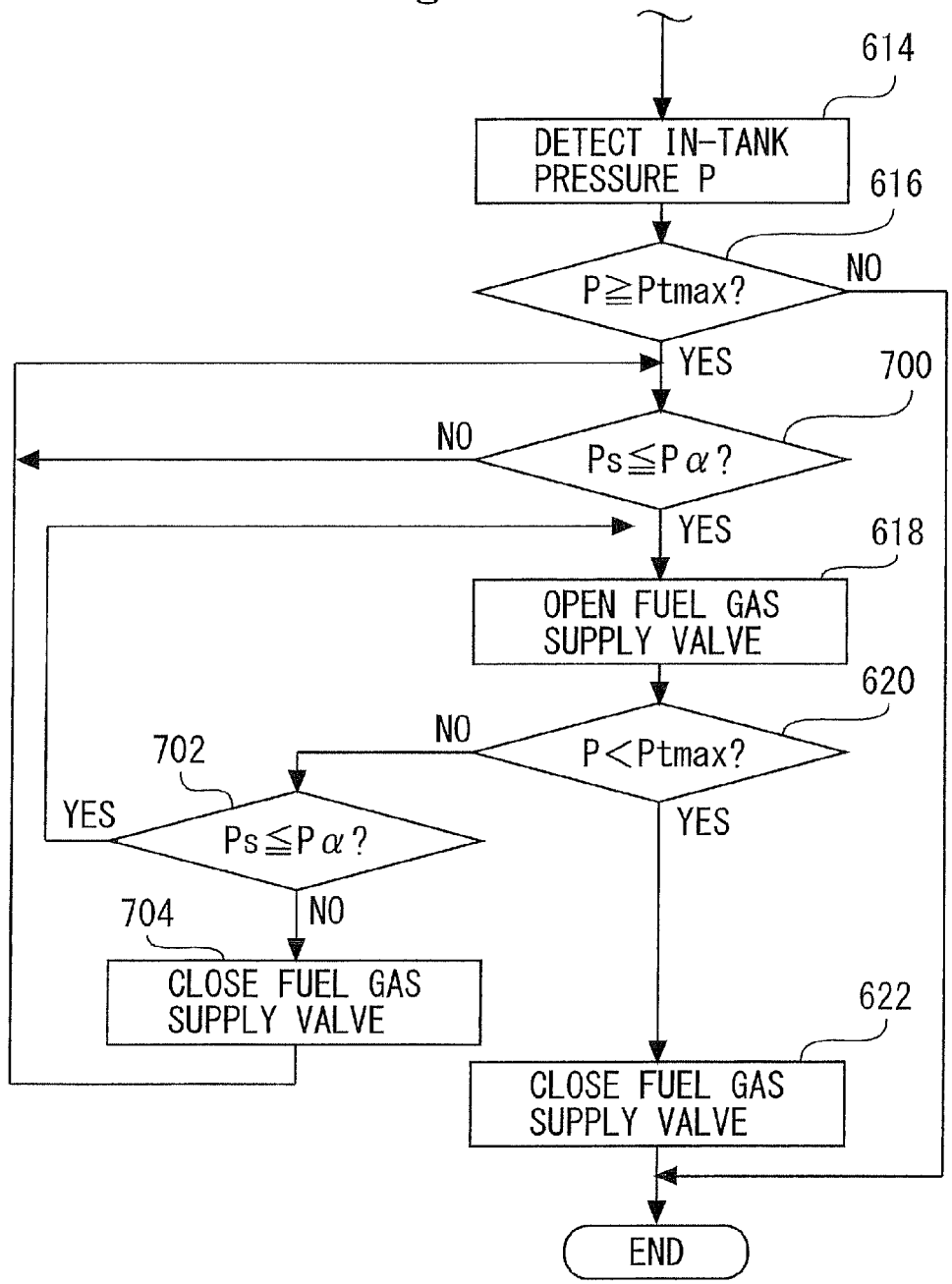
FIG. 14 is a flowchart showing the second modification of the control shown in FIG. 12 according to the embodiment 8 of the present invention.

This embodiment can be configured as shown in FIG. 14, which shows a second modification. FIG. 14 is a flowchart showing the second modification of the control shown in FIG. 12 according to the embodiment 8 of the present invention. The second modification consists in adding Steps 702 and 704 to the process according to the first modification, and therefore, description of the processings in the other steps will be omitted.

As shown in FIG. 14, according to the second modification, in order to reduce the in-tank pressure P to be lower than the withstanding pressure Ptmax, it is determined whether or not the pressure Ps in the surge tank 20 is equal to or lower than the predetermined value Pa while the fuel gas supply valve 38 is kept open (Step 702). If the result of the determination is positive, the backflow of air described above does not occur, so that the fuel gas supply valve 38 is kept open. On the other hand, if the result of the determination in Step 702 is negative, the fuel gas supply valve 38 is closed to prevent the backflow of air (Step 704). According to this configuration, even if the operational state of the engine changes and the pressure in the surge tank 20 increases after the fuel gas supply valve 38 is opened, the backflow of air can be prevented with reliability.

In the embodiment 8 described so far, Step 608 shown in FIG. 12 represents a specific example of the saturation vapor pressure calculating means according to claim 10, and Step 610 represents a specific example of the fuel supply amount calculating means. Steps 616 and 618 shown in FIGS. 12 to 14 represent a specific example of pressure relief controlling means according to claim 12.

Although the configurations according to the embodiments 1 to 8 have been described as separate configurations, the present invention is not limited to these separate configurations. That is, the present invention can also be implemented by combining any number of the configurations according to the embodiments 1 to 8.

In the embodiments described above, the surge tank 20 has been described as an example of the component for supplying the fuel gas to the intake air channel 12. However, the present invention is not limited to this configuration, and the fuel gas tank 34 can be connected to any part of the intake air channel 12 downstream of the throttle valve 18, and the fuel gas can be supplied to the part.

In the embodiments described above, the engine 10 is provided with both the intake port injection valve 26 and the in-cylinder injection valve 28. However, the present invention is not limited to this configuration and can also be applied to an internal combustion engine that is provided with only one of the injection valves 26 and 28 and is not provided with the other.

In the embodiments described above, the engine 10 using an alcohol fuel has been described as an example. However, the present invention is not limited to this configuration and can also be applied to any engine using any kind of fuel including normal gasoline and gasoline blended with an additive other than alcohol.

DESCRIPTION OF REFERENCE NUMERALS 10 engine (internal combustion engine), 12 intake air channel, 14 exhaust gas channel, 16 air cleaner, 18 throttle valve, 20 surge tank (intake air channel), 22 intake manifolds (intake air channel), 24 intake port (intake air channel), 26 intake port injection valve (fuel injection valve), 28 in-cylinder injection valve (fuel injection valve), 32 fuel tank, 34 fuel gas tank, 36 in-tank injection valve (in-tank fuel supplying means), 38 fuel gas supply valve, 40 atmosphere introducing valve, 42 relief valve (pressure relief mechanism), 50 air pressure sensor, 52 tank pressure sensor, 54 tank temperature sensor, 56 fuel property sensor, 60 ECU, 70 cooling piping (heating means), 80 heat pipe (heating means)

The invention claimed is:

1. A fuel supply system for an internal combustion engine, comprising:
a fuel tank that stores a fuel;
a fuel injection valve through which the fuel in said fuel tank is injected into an intake air channel and/or a combustion chamber;
a fuel gas tank that is connected to said intake air channel and stores a fuel gas generated by vaporizing said fuel;

an in-tank fuel supplying means of supplying the fuel in said fuel tank to said fuel gas tank in order to generate the fuel gas in said fuel gas tank;

a fuel gas supply valve that is a normally closed valve that opens and closes a connection between said fuel gas tank and said intake air channel and is opened at the start of the internal combustion engine;

generation controlling means of driving said in-tank fuel supplying means during operation of the internal combustion engine in a state where said fuel gas supply valve is closed to generate the fuel gas in said fuel gas tank; and supply controlling means of opening said fuel gas supply valve at the start of the internal combustion engine to supply the fuel gas stored in said fuel gas tank to said intake air channel during operation of the internal combustion engine.

2. The fuel supply system for an internal combustion engine according to claim 1, wherein said generation controlling means is configured to drive said in-tank fuel supplying means in a case where the temperature in said fuel gas tank is higher than a predetermined criterion temperature for judging whether generation of the fuel gas is possible.

3. The fuel supply system for an internal combustion engine according to claim 1, said supply controlling means is configured to open said fuel gas supply valve in a case where the temperature of the internal combustion engine at the start thereof is lower than a predetermined criterion temperature for judging whether the fuel gas is required.

4. The fuel supply system for an internal combustion engine according to claim 1, further comprising fuel form switching means of making said supply controlling means supply the fuel gas for combustion in the first cycle at the start of the internal combustion engine and making said fuel injection valve inject the fuel for combustion in the second and subsequent cycles.

5. The fuel supply system for an internal combustion engine according claim 1, further comprising an atmosphere introducing valve that is a normally closed valve provided at a position where the atmosphere introducing valve is capable of connecting the interior of said fuel gas tank and the outside space to each other and is opened and closed together with said fuel gas supply valve.

6. The fuel supply system for an internal combustion engine according to claim 5, further comprising valve opening order changing means of successively opening said fuel gas supply valve and said atmosphere introducing valve when supplying the fuel gas and changing the order of opening of said valves based on the magnitude relationship between the pressure in said fuel gas tank and the atmospheric pressure.

7. The fuel supply system for an internal combustion engine according to claim 1, further comprising a pressure relief mechanism that relieves the pressure in said fuel gas tank to the outside when the pressure in said fuel gas tank is higher than a predetermined working pressure.

8. The fuel supply system for an internal combustion engine according to claim 1, further comprising heating means of heating said fuel gas tank.

9. The fuel supply system for an internal combustion engine according claim 1, further comprising:

saturation vapor pressure calculating means of calculating the saturation vapor pressure of said fuel; and fuel supply amount calculating means of calculating the amount of fuel to be supplied to said fuel gas tank by said in-tank fuel supplying means based on the saturation vapor pressure of said fuel and the temperature and the volume of said fuel gas tank.

10. The fuel supply system for an internal combustion engine according to claim 9, further comprising limiting means of preventing the amount of fuel to be supplied from being calculated based on the saturation vapor pressure when the saturation vapor pressure is higher than the withstanding pressure of said fuel gas tank.

11. The fuel supply system for an internal combustion engine according to claim 1, further comprising pressure relief controlling means of opening said fuel gas supply valve in a case where the pressure in said fuel gas tank is equal to or higher than the withstanding pressure of the tank.

12. The fuel supply system for an internal combustion engine according to claim 1, wherein said fuel is an alcohol fuel.

13. A fuel supply system for an internal combustion engine, comprising:

a fuel tank that stores a fuel;

a fuel injection valve through which the fuel in said fuel tank is injected into an intake air channel and/or a combustion chamber;

a fuel gas tank that is connected to said intake air channel and stores a fuel gas generated by vaporizing said fuel;

an in-tank fuel supplying unit of supplying the fuel in said fuel tank to said fuel gas tank in order to generate the fuel gas in said fuel gas tank; and a fuel gas supply valve that is a normally closed valve that opens and closes a connection between said fuel gas tank and said intake air channel and is opened at the start of the internal combustion engine;

generation controlling unit of driving said in-tank fuel supplying unit during operation of the internal combustion engine in a state where said fuel gas supply valve is closed to generate the fuel gas in said fuel gas tank; and supply controlling unit of opening said fuel gas supply valve at the start of the internal combustion engine to supply the fuel gas stored in said fuel gas tank to said intake air channel during operation of the internal combustion engine.

* * * * *